(12) United States Patent
Johnson et al.

(10) Patent No.: US 12,536,001 B1
(45) Date of Patent: Jan. 27, 2026

(54) GENERATING, MANAGING, AND ORGANIZING PERSISTED DATA ELEMENTS BASED ON ONE OR MORE STATES OF AN AGENT

(71) Applicant: Dropbox, Inc., San Francisco, CA (US)

(72) Inventors: Jessica D. Johnson, San Marcos, CA (US); Rajkumar Janakiraman, Sammamish, WA (US); Ranjitha Gurunath Kulkarni, Sunnyvale, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/215,045

(22) Filed: May 21, 2025

(51) Int. Cl.
   *G06F 8/35* (2018.01)
   *G06F 8/41* (2018.01)
   *G06F 9/455* (2018.01)
   *G06F 40/40* (2020.01)
   *G06N 20/00* (2019.01)

(52) U.S. Cl.
   CPC .................. *G06F 8/35* (2013.01); *G06F 8/44* (2013.01); *G06F 9/45504* (2013.01); *G06F 40/40* (2020.01); *G06N 20/00* (2019.01)

(58) Field of Classification Search
   CPC .......... G06F 8/35; G06F 8/44; G06F 9/45505; G06N 20/00
   See application file for complete search history.

(56) References Cited

U.S. PATENT DOCUMENTS

| | | |
|---|---|---|
| 5,784,286 A | 7/1998 | Hirose et al. |
| 5,802,373 A * | 9/1998 | Yates .................. G06F 9/45504 717/139 |
| 5,867,720 A | 2/1999 | Hirano |
| 7,551,711 B2 | 6/2009 | Sarment et al. |
| 8,097,860 B2 | 1/2012 | Tabat et al. |
| 9,496,987 B2 | 11/2016 | Naaman et al. |
| 9,503,220 B2 | 11/2016 | Naaman et al. |
| 9,619,209 B1 * | 4/2017 | Allen .................... G06F 40/205 |

(Continued)

FOREIGN PATENT DOCUMENTS

CN          107908933 A  *  4/2018   ........... H04L 9/0618

OTHER PUBLICATIONS

Wu, Di, et al., LongMemEval: Benchmarking Chat Assistants on Long-Term Interactive Memory, ICLR 2025, Mar. 2025, 28 pages , [retrieved on Oct. 16, 2025], Retrieved from the Internet: <URL:https://arxiv.org/abs/2410.10813>.*

*Primary Examiner* — Geoffrey R St Leger
(74) *Attorney, Agent, or Firm* — Keller Preece PLLC

(57) ABSTRACT

The present disclosure relates to systems, non-transitory computer-readable media, and methods for generating, storing, and accessing persisted data elements in a large language model framework. For instance, the disclosed systems can generate a code segment that includes a set of parameters and a function with a large language model associated with a context engine. In some cases, the disclosed systems can determine the serialized state of the interpreter based on executing the code segment. In one or more implementations, the disclosed systems can generate a persisted data element from the serialized state of the interpreter and store the persisted data element in an interpreter data store. The disclosed systems can further access the persisted data element from the data store to generate responses or perform tasks in the same or subsequent sessions.

20 Claims, 11 Drawing Sheets

(56) References Cited

U.S. PATENT DOCUMENTS

| | | |
|---|---|---|
| 10,830,641 B2 | 11/2020 | Mai et al. |
| 2004/0127458 A1 | 7/2004 | Hunter et al. |
| 2012/0304516 A1 | 12/2012 | Yang |
| 2017/0049702 A1 | 2/2017 | Bacon et al. |
| 2024/0403697 A1* | 12/2024 | Nordfors ............. G06F 16/3329 |
| 2024/0419977 A1* | 12/2024 | Perez ...................... G06N 3/09 |

* cited by examiner

GENERATING, MANAGING, AND ORGANIZING PERSISTED DATA ELEMENTS BASED ON ONE OR MORE STATES OF AN AGENT

BACKGROUND

Recent years have seen significant developments in artificial intelligence (AI) software and usage of large language models. Indeed, the increased popularity of large language models and the ever-evolving context of the internet has led to AI, and more specifically large language models, generating, summarizing, translating, and classifying digital content. For example, during a session, a large language model can perform tasks ranging from summarizing notes to generating images. Based on these capabilities, some existing systems attempt to maintain the history and/or context of sessions to keep conversations informed and on topic. Despite these advances, however, existing systems continue to exhibit a number of disadvantages, particularly in terms of accuracy, efficiency, and flexibility.

As just suggested, certain systems that store information with large language models are inaccurate. In particular, existing systems store information generated for a session with the large language model in an unstructured format, such as natural or freeform language. When relying on such unstructured data for response generation, existing systems are non-deterministic and highly variable. Indeed, existing systems can process the same natural language context many times, generating a different response for each pass with varying levels of accuracy or relevance. Additionally, the unstructured nature of their contextual data prevents some existing systems from determining which contextual data to access and use in generating a response or performing a task with a large language model. The resulting responses of existing systems are therefore often inaccurate, or at least not as accurate as they could be with more precise definitions of contextual data.

In addition to their accuracy issues, some existing systems are also inefficient. For example, as mentioned above, some existing systems store contextual data for a large language model as unstructured data (e.g., natural language text of queries and responses for a turn-by-turn conversation). However, storing unstructured data requires an excessive amount of computer storage to store, and further requires an excessive amount of processing power and memory to recall and process in generating responses. Indeed, the character count (and corresponding data size) of natural language data grows ever larger with each new query and response, and the computational load for storing and processing the context grows with it. When recalling context for a session, some existing systems tokenize the query, responses, and content items (e.g., documents) for an entire conversation, potentially including many turns. The computational expense of tokenizing the text-based conversation only grows as the conversation grows larger (e.g., growing exponentially with each new query as every previous query is repeatedly retokenized).

Additionally, unstructured data introduces ambiguities in response generation. Thus, existing systems often utilize extra computing resources for tools such as full-text search to query data, pre-processing steps (e.g., text cleaning) to analyze the unstructured data, and/or natural language processing models to rectify ambiguities in the data. By relying on these extra tools, existing systems unnecessarily utilize computing resources processing contextual data to generate responses.

SUMMARY

This disclosure describes one or more embodiments of systems, methods, and non-transitory computer-readable storage media that provide benefits and/or solve one or more of the foregoing and other problems in the art. The disclosed systems can generate, store, and access persisted data elements as structured contextual data for facilitating accurate (e.g., deterministic), efficient operation of a large language model framework. For instance, the disclosed systems can generate a code segment that includes a set of parameters and a function with a large language model associated with a context engine. In some cases, the disclosed systems can execute the code segment with an interpreter (or agent) to generate an output and/or perform a task. In some cases, the disclosed systems can serialize the state of the interpreter executing the code segment and can store the serialized state as a set of parameters and/or a function of the code segment. In one or more cases, the disclosed systems can generate and store a persisted data element from the serialized state of the interpreter. In particular, the disclosed systems can generate the persisted data element with a fixed data structure (e.g., of a particular data type or data model) for access as contextual data in later sessions or turns with a large language model. In one or more embodiments, the disclosed systems can store the persisted data element in an interpreter data store.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

This disclosure describes one or more embodiments of a structured data management system that can generate, store, and access a persisted data element based on a serialized state of an agent (e.g., interpreter). In some cases, the structured data management system can utilize the structure of the state of the interpreter to generate concrete structured data (e.g., persisted data element(s)) that the context engine, large language model, and interpreter can call upon when generating a response. For example, in some cases, the structured data management system can generate a code segment (e.g., computer code) using a large language model connected to a context engine. In some cases, the code segment can include a set of parameters (or variables) and a function that the interpreter connected to the context engine can execute. In one or more embodiments, the structured data management system can serialize a state of the interpreter as the interpreter executes the data segment and/or computer code.

Accordingly, in some implementations, the structured data management system can determine the serialized state of the interpreter based on executing the code segment. In one or more embodiments, the structured data management system can generate a persisted data element from the serialized state of the interpreter. In particular, the structured data management system can generate the persisted data element, where the persisted data element has a fixed data structure that corresponds to a data type or a data model (e.g., for at least one parameter from the set of parameters), where a data model may include multiple data types (e.g., a compound data type). In one or more cases, the structured data management system can store the persisted data element in an interpreter data store where the structured data management system can enable the management, modification, and/or persistence of the persisted data element.

Figure 1:
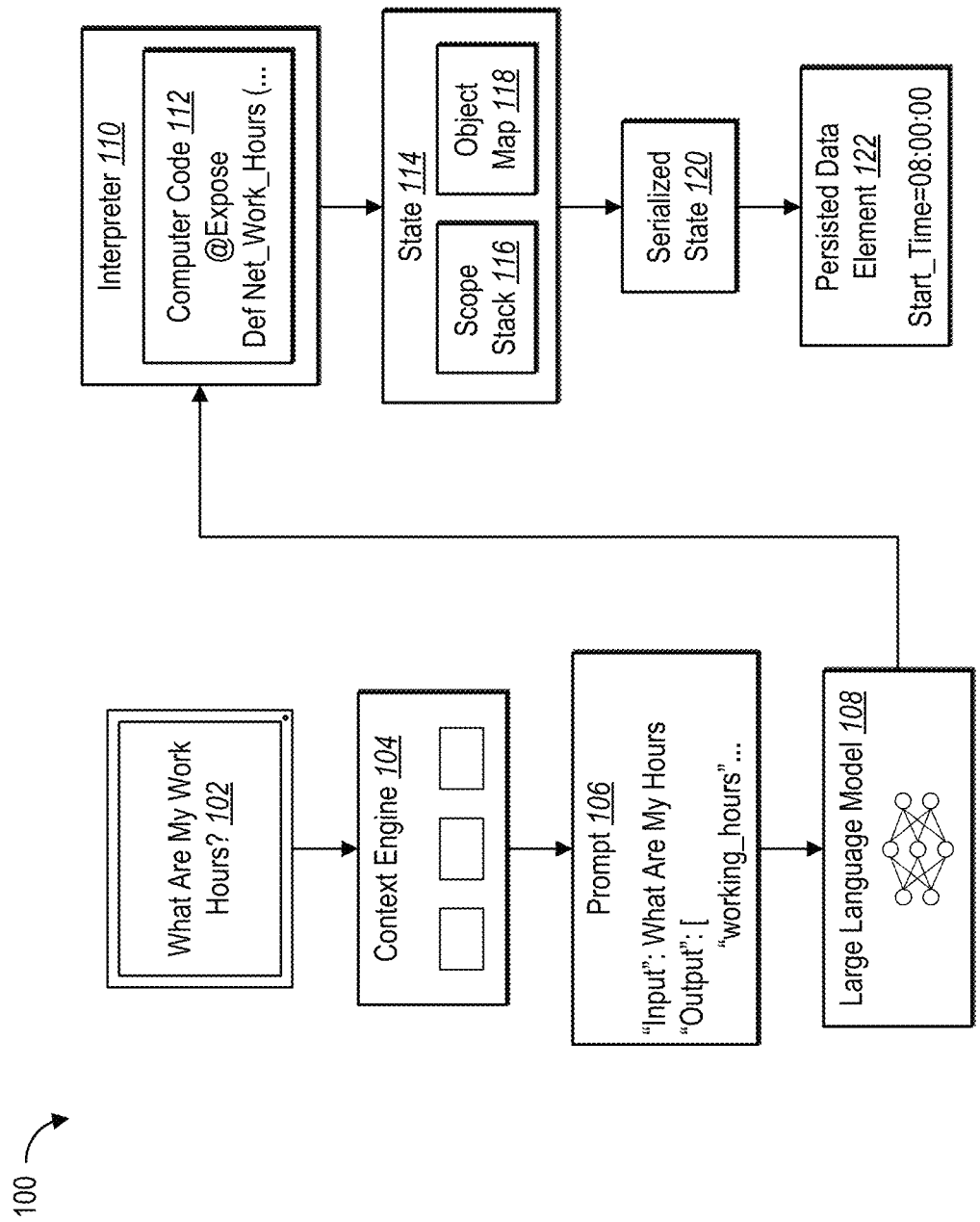
FIG. 1 illustrates an example overview of a structured data management system generating a persisted data element in accordance with one or more embodiments.

As just mentioned, the structured data management system can generate a persisted data element from a serialized state of an interpreter. FIG. 1 illustrates an example overview of a structured data management system generating a persisted data element in accordance with one or more embodiments. Additional detail regarding the various acts and processes introduced in relation to FIG. 1 is provided thereafter with reference to subsequent figures.

In one or more embodiments, a structured data management system 100 can receive a query 102 reading "What are my work hours?" from a client device associated with a user account. As shown in FIG. 1, a context engine 104 can process the query 102 to generate a prompt 106 that comprises one or more example functions related to the query 102. In some cases, based on the prompt can also include information instructing the large language model 108 on how to retrieve a persisted data element. For example, the prompt 106 can instruct the large language model 108 to generate a coded segment that pulls persisted data elements associated with a phone number data model (which may include data types for strings, floats, integers, or other strongly defined data types). In one or more embodiments, the structured data management system 100 utilizes the context engine to generate the prompt 106 as described by Ranjitha Gurunath Kulkarni et al. in U.S. patent application Ser. No. 19/184,603, titled CONTEXT ENGINE AND INTERPRETER EXECUTING COMPUTER CODE FOR MULTI-TURN INTERACTIONS, filed on Apr. 21, 2025, which is hereby incorporated by reference in its entirety.

As further shown in FIG. 1, the structured data management system 100 can generate computer code 112 by processing the prompt 106 with a large language model 108 associated with the context engine 104. In some cases, the computer code 112 can include one or more code segments, where the code segment comprises a set of parameters (or variables) and a function. As shown in FIG. 1, the structured data management system 100 can execute the code segment (or computer code) with an interpreter 110 that is associated with the context engine 104.

In one or more embodiments, the architecture of the interpreter comprises a state 114 and a control. For example, the state 114 of the interpreter 110 can include a scope stack 116 and an object map 118 as described in U.S. patent application Ser. No. 19/184,603 (incorporated above). In some cases, the state 114 of the interpreter 110 can reflect the values, data structures, and/or identifiers (e.g., names) of the set of one or more parameters as the interpreter 110 executes the code segment (or computer code 112). In one or more embodiments, the values, data structures, and/or identifiers (e.g., names) of the set of one or more parameters are dynamic during runtime (e.g., execution) of the code segment by the interpreter 110. For example, the interpreter 110 can generate a data element or output that can change based on the logic of the agent (e.g., interpreter 110).

As further shown in FIG. 1, the structured data management system 100 can generate a serialized state 120 of the interpreter 110. In some cases, the structured data management system 100 can serialize the state 114 of the interpreter 110 by converting the format of the set of parameters to a format that can be stored in an interpreter data store. In some cases, the structured data management system 100 can utilize protocol buffers, FlatBuffers, JavaScript Object Notation (JSON), Pickle, YAML, Comma Separated Values (CSV), Extensible Markup Language (XML), MessagePack, Apache Parquet, customized serialization, etc., to generate the serialized state 120 of the interpreter 110 and hardcode the set of parameters associated with the code segment (or a plurality of sets of parameters associated with the computer code 112). In some cases, the parameter from amongst the set of parameters associated with the code segment is not hardcoded, but instead can take on a fixed structure as determined by the large language model 108. For example, the large language model 108 can determine that the fixed structure of the persisted data element is a Python dictionary or JSON format.

In one or more embodiments, the structured data management system 100 can generate a persisted data element 122. In particular, the structured data management system 100 can utilize the structured data of the serialized state 120 of the interpreter 110 to generate the persisted data element 122 comprising the fixed data structure. For example, based on the structured data management system 100 hardcoding a value of a parameter from the set of parameters through serialization, the structured data management system 100 can generate the persisted data element 122 with a concrete value and fixed data structure that corresponds to the parameter from among the set of parameters. To further illustrate, the structured data management system 100 can retrieve a value of a parameter generated by the state 114 from the serialized state 120 of the state 114. The structured data management system 100 can generate the persisted data element with the value in a CSV table format. In some cases, the structured data management system 100 can generate the persisted data element 122 based on receiving user input via the large language model 108. For example, the structured data management system 100 can receive user input instructing the large language model 108 to remember that Sam's birthday is Apr. 1, 2010, and to include it according to a Python dictionary. Based on the instruction, the structured data management system 100 can generate a persisted data element for Sam's birthday. In some cases, the structured data management system 100 can store the persisted data element 122 in the interpreter data store.

As suggested above, the structured data management system 100 can provide several improvements or advantages over existing large language model systems. For example, the structured data management system 100 can provide improved accuracy over many existing systems because the structured data management system 100 stores persisted data elements according to a concrete and fixed data structure. For example, the structured data management system 100 can generate highly accurate responses because the well-defined data structure of the persisted data elements prevents ambiguities and provides precise data from which to base task execution or response generation. Accordingly, the structured data management system 100 can generate deterministic responses (and/or deterministically execute tasks) by utilizing structured data (e.g., persisted data elements) rather than unstructured naturally language text.

In addition to improving upon accuracy of conventional systems, in some embodiments, the structured data management system 100 further improves upon efficiency. Unlike conventional systems, which generally pre-process, reprocess, retokenize, and/or tokenize the entirety of (the text of) queries, responses, and/or source content items associated with prior individual sessions to recall previous contexts or values of parameters, the structured data management system 100 can quickly identify and pull one or more relevant persisted data elements during response generation without having to needlessly sift through and process large volumes of unstructured data to determine the context or theme of prior sessions with the large language model. Indeed, the structured data management system 100 can maintain a more condensed, efficient context of sessions of a large language model using less memory resources. For example, the structured data management system 100 greatly reduces the required storage space for persisting, modifying, and storing the persisted data elements because the fixed data structure stores and accesses serialized interpreter states for contextual data rather than natural language text (thus resulting in far fewer stored bytes than some conventional systems). The smaller storage consumption further allows the structured data management system 100 to store more data for longer (resulting in yet further accuracy improvement) because the structured data management system 100 is less likely to exceed or meet the token limits of a context window or a model, as compared to prior systems.

On top of improved efficiency, the structured data management system 100 is more flexible than existing systems. For example, the strongly typed and/or hardcoded nature of the persisted data elements allows different large language models and/or agents to utilize and/or process the persisted data elements for response generation or performing a task. For example, lighter large language models can generate a similar result compared to heavier large language models because the persisted data element is easily readable, clean, and syntactically correct (or well-formed). Moreover, the structured data management system 100 can adapt the structure of the data elements to different models allowing the structured data management system 100 to use various agents, large language models, and/or rule-based models to generate a response.

As illustrated by the foregoing discussion, the present disclosure utilizes a variety of terms to describe features and benefits of the structured data management system 100. Additional detail is hereafter provided regarding the meaning of these terms as used in this disclosure. As used herein, the term "query" (or text query) includes or refers to data or a specific model output request in the form of input to search for information within a system and/or to generate information using a large language model. In some cases, a query can be a text query using natural language, requesting a large language model to perform a specific task. Moreover, in some instances, the structured data management system 100 extracts data from a query. Specifically, the structured data management system 100 can extract natural language structured programmatic data from a query. Thus, in some instances, the structured data management system 100 generates computer code (e.g., utilizing the context engine interacting with the large language model) in response to extracting natural language structured programmatic data from a query.

As mentioned above, the structured data management system 100 utilizes a context engine. As used herein, the term "context engine" includes or refers to a model (e.g., a machine learning model) that works in conjunction with a large language model to break down text queries into one or more prompts and to generate computer code from the one or more prompts. For instance, a context engine can determine, based on the query, one or more multi-turn examples to include in the prompt that instruct a large language model to generate computer code for execution by an interpreter. In some embodiments, the structured data management system 100 utilizes the context engine (e.g., context engine) as described by Rajkumar Janakiraman in U.S. patent application Ser. No. 18/309,496, titled GENERATING MULTI-ORDER TEXT QUERY RESULTS UTILIZING A CONTEXT ORCHESTRATION ENGINE, filed on Apr. 28, 2023, which is hereby incorporated by reference in its entirety. In one or more interpretations, the structured data management system 100 utilizes the context engine as described by James Johnson in U.S. patent application Ser. No. 18/482,715, titled CUSTOM INTERPRETER FOR EXECUTING COMPUTER CODE GENERATED BY A LARGE LANGUAGE MODEL, filed on Oct. 6, 2023, which is hereby incorporated by reference in its entirety.

As used herein, the term "code segment" can include or refer to a portion of executable computer code. In some cases, a code segment can include, or be executable to perform, a function using a set of parameters. For example, a code segment can include a set of variables (or parameters) defined in (or by) the function. In some embodiments, a code segment can correspond to a sub-component of a query. In one or more implementations, computer code can include one or more code segments.

Relatedly, as used herein, the term "serialized state" includes or refers to a standardized, storable, and retrievable data format of a state of an agent, such as an interpreter. In particular, a serialized state can include a strongly typed definition of an interpreter state, defined to reflect variables, objects, attributes, and/or parameters within computer code and/or executed computer code by an agent in a platform-agnostic (or independent) format.

As used herein, the term "persisted data element" can include or refer to a unit of serialized state data that is saved in a database and retrievable. In some cases, the persisted data element comprises a parameter that follows a fixed data structure for a data type (e.g., integer, Boolean, character, float, string) or data model (e.g., JSON object, compound data type, or other data types of varying levels of complexity) made up of multiple data types. For example, a persisted data element can be a name of a contact, a phone number, a melting point, etc. In one or more implementations, the persisted data element can be user-defined. For example, the structured data management system 100 could receive a query reading "remember James' birthday is Apr. 2, 1970." In one or more cases, the structured data management system 100 can create a persisted data element for Apr. 2, 1970, and define it as James' birthday and utilize a JSON format (e.g., {"Name": James", "birthday"; "1970-04-02" }. In some cases, the persisted data element can be hardcoded and strongly typed. For example, the persisted data element can be the same data in the same format or structure for access by the interpreter, large language model, and/or context engine.

As mentioned above, the context engine includes or refers to a machine learning model. In one or more embodiments, a "machine learning model" includes a computer algorithm or a collection of computer algorithms that can be trained and/or tuned based on inputs to approximate unknown functions. For example, a machine learning model can include a computer algorithm with branches, weights, or parameters that change based on training data to improve a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Similarly, a "neural network" includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components that, when trained, form a large language model.

Along these lines, as used herein, the term "large language model" includes or refers to one or more neural networks capable of processing natural language text to generate outputs that range from predictive outputs, analyses, or combinations of data within stored content items. In particular, a large language model can include parameters trained (e.g., via deep learning) on large amounts of data to learn patterns and rules of language for summarizing and/or generating digital content. Examples of a large language model include BLOOM, Bard AI, ChatGPT, LaMDA, DialoGPT, DropboxGPT, and Dropbox FileGPT.

As mentioned above, the structured data management system 100 utilizes an interpreter to run computer code generated by a large language model. As used herein, the term "interpreter" includes or refers to a software or application program that is in communication with a large language model and/or a context engine and that reads and executes computer code (e.g., source code) written in a high-level programming language. For instance, the interpreter can read computer code line by line, statement by statement, or instruction by instruction and can execute the code without converting it into machine code. In some cases, an interpreter can also or alternatively translate the computer code into machine code or another representation. Moreover, in some instances, the interpreter does not utilize a separate compilation step to run computer code.

As used herein, the term "digital content item" (e.g., "source content item" or simply "content item") refers to a digital object or a digital file that includes information interpretable by a computing device (e.g., a client device) to present information to a user. A content item can include a file or a folder such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is specific to a particular computer application and is accessible via a file system or via a network connection. A content item can be editable or otherwise modifiable and can also be shareable from one user account (or client device) to another. In some cases, a content item is modifiable by multiple user accounts (or client devices) simultaneously and/or at different times.

Figure 2:
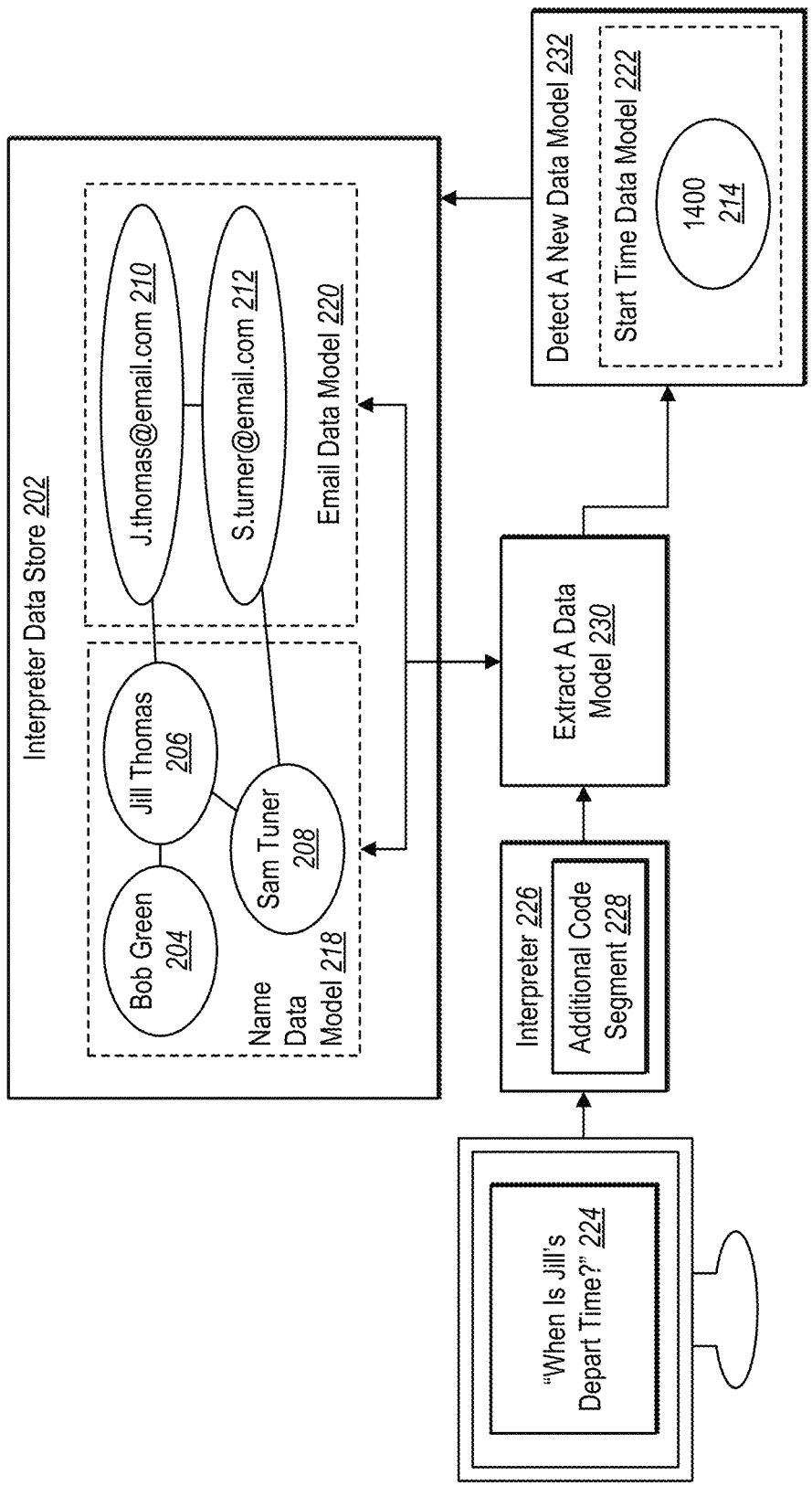
FIG. 2 illustrates a structured data management system managing one or more persisted data elements via an element graph in accordance with one or more embodiments.

As mentioned above, the structured data management system 100 can store, manage, add, remove, classify, cluster, and/or modify one or more persisted data elements in an interpreter data store. FIG. 2 illustrates the structured data management system 100 managing one or more persisted data elements via an element graph in accordance with one or more embodiments.

For example, FIG. 2 shows an interpreter data store 202. In one or more embodiments, the interpreter data store 202 can store one or more persisted data elements for a user account. In some cases, the structured data management system 100 can generate a plurality of per-user interpreter data stores comprising collections of persisted data elements.

As shown in FIG. 2, the structured data management system 100 can generate and/or store an element graph reflecting the relationships among the plurality of persisted data elements. In one or more cases, a plurality of nodes can represent the plurality of persisted data elements, and a plurality of edges can represent a plurality of relationships among the plurality of nodes. For example, the structured data management system 100 can show the relationship between a first node (or persisted data element) reading "Jill Thomas" and a second node (or persisted data element) reading "J.thomas@email.com" with an edge that reflects that Jill Thomas' email is J.thomas@email.com. In one or more cases, the structured data management system 100 can determine the relationship (or edge) between the plurality of nodes based on information received and/or generated during a session of a large language model. For example, during the session with the large language model, the structured data management system 100 can access a contact document comprising a list of employee contacts with their names, emails, department, telephone numbers, work hour start times, birthdays, etc. In some cases, the structured data management system 100 can receive one or more user interactions instructing the structured data management system 100 to organize the contacts document according to department. In one or more embodiments, while the structured data management system 100 organizes the contacts according to department, the structured data management system 100 can generate persisted data elements associated with the contacts and their corresponding attributes.

In some cases, the structured data management system 100 can receive one or more user interactions instructing the large language model to generate data elements (or persisted data elements for the one or more parameters (or variables). For example, the structured data management system 100 can receive user input instructing the large language model to generate and store a list of telephone numbers. In some cases, the structured data management system 100 can generate, utilizing a context engine, a prompt with one or more example functions for accessing and generating a list of telephone numbers. In some cases, the structured data management system 100 can provide the prompt to the large language model, and the large language model can generate computer code or a code segment with a function and set of parameters for extracting the telephone numbers. Additionally, as the interpreter executes the computer code, the structured data management system 100 can track and serialize the state of the interpreter. In one or more cases, based on the structured data of the telephone numbers in the serialized state of the interpreter, the structured data management system 100 can generate a plurality of persisted data elements for the list (or plurality) of telephone numbers.

As shown in FIG. 2, the structured data management system 100 can cluster and/or group the plurality of persisted data elements according to data types or data models (e.g., where data elements of the same type or model, or having the same data structure, are clustered together). For example, as shown in FIG. 2, the structured data management system 100 can cluster a first node 204, a second node 206, and a third node 208 according to a first data type or a first data model (e.g., name data model 218) because each node (e.g., persisted data element) represents a name of a contact. As further shown in FIG. 2, the structured data management system 100 can cluster a fourth node 210 and a fifth node 212 according to an email data model 220 because each node (e.g., persisted data element) represents an email of a contact. In some cases, the structured data management system 100 can determine a data type or a data model (e.g., email data model 220) based on user input defining the data type or the data model. For example, the structured data management system 100 can receive from the user an example of the email data model, and based on the email data model example, generate the email data model. 220. Alternatively, in some cases, the structured data management system 100 can recognize a shared feature of a plurality of data elements and generate a data model based on the shared feature. In some cases, the data model can house persisted data elements with various data types.

In one or more embodiments, the structured data management system 100 can update and/or manage the data models, relationships, and/or persisted data elements within the interpreter data store 202. For example, the structured data management system 100 can generate one or more new data models based on user input from a user account associated with the interpreter data store 202 and/or detecting one or more new data models from computer code or a code segment executed by an interpreter 226. For example, as FIG. 2 illustrates, the structured data management system 100 can receive an additional query 224 reading "When is Jill's depart time?" Accordingly, the structured data management system 100 can generate a prompt (e.g., an additional prompt) associated with the additional query 224 instructing the large language model to generate computer code or an additional code segment 228 that the interpreter 226 can execute. In some cases, the prompt, generated by the context engine, can instruct the large language model to determine the data model necessitated by the query. For example, because the start time data model 222 does not exist yet, the large language model could determine the necessity of the start time data model 222. Moreover, the structured data management system 100 can determine the fixed data structure for the start time data model 222. For example, the structured data management system 100 could determine that a Python dictionary with an integer was the best fixed data structure for the start time data model 222.

As indicated in FIG. 2, as the interpreter 226 executes the additional code segment 228, the structured data management system 100 can analyze an additional state of the interpreter 226 and/or the output (e.g., data elements) from the interpreter 226. For example, execution of the additional code segment 228 and/or the additional state of the interpreter 226 can indicate that Jill's departure time is 2:00 PM (or 1400), and the structured data management system 100 can generate a data element 214 representing the 1400 departure time. As indicated above, in some cases, the structured data management system 100 can use the additional state of the interpreter 226 to generate the data element 214.

As FIG. 2 further illustrates, the structured data management system 100 can extract a data model 230 from the output (e.g., data element 214) of the interpreter 226. In some cases, the structured data management system 100 can compare the data element 214 with the data models in the interpreter data store 202 to determine if the data model associated with the data element 214 exists in the interpreter data store 202. As shown in FIG. 2, the data model corresponding to the data element 214 does not exist in the interpreter data store 202. Accordingly, as shown in FIG. 2, the structured data management system 100 can detect a new data model 232. In particular, the structured data management system 100 can detect a start time data model 222 for the data element 214. In one or more cases, the structured data management system 100 can add the start time data model 222 to the interpreter data store 202. Additionally, when the structured data management system 100 adds the start time data model 222 to the interpreter data store 202, the structured data management system 100 can generate an additional persisted data element (or additional node) for the data element 214 by serializing the data element 214 and storing the additional node corresponding to the serialized data element 214 (e.g., additional persisted data element) in the interpreter data store 202. Additionally, in one or more implementations, the structured data management system 100 can generate an edge reflecting the relationship between the additional node corresponding to the data element 214 and the second node 206.

As indicated above, the structured data management system 100 can receive user input from a client device associated with a user account defining a new data model for the interpreter data store 202. For example, the structured data management system 100 can receive user input defining a job title data model. In some cases, when the structured data management system 100 detects the new data model (e.g., job title data model), the structured data management system 100 can analyze one or more historical sessions with the large language model and/or historical states of the interpreter 226 to determine if any existing persisted data elements correspond to the new data model.

In some embodiments, the structured data management system 100 can store persisted data elements for different time periods based on the data model of the persisted data elements. For example, the structured data management system 100 can update and/or store a first subset of persisted data elements associated with a first data model (e.g., email data model) for a first period of time (e.g., three-month period) and a second subset of persisted data elements associated with a second data model (e.g., name data model) for a second period of time (e.g., 6-month period). In one or more cases, the structured data management system 100 can receive one or more user interactions defining how long to update and/or store persisted data elements associated with data models. Relatedly, in one or more cases, the structured data management system 100 can determine how often to update the data models of persisted data elements. For example, the structured data management system 100 can update persisted data elements of the name data model 218 weekly and update the persisted data elements of the start time data model 222 on a bi-weekly basis. In some cases, the structured data management system 100 can update or persist the data elements by restoring the serialized state of the interpreter and pulling fresh data from a database. In some cases, the structured data management system 100 can update a persisted data element based on the computer code and/or code segment associated with the persisted data element. In particular, the structured data management system 100 can pull the executed computer code and/or code segment from the state of the interpreter associated with the persisted data element and re-execute the computer code with the interpreter. In some cases, by rerunning the executed computer code and/or code segment, the structured data management system 100 can update the values and/or parameters of the persisted data element.

In some cases, the structured data management system 100 can cluster (or group) persisted data elements according to classes and/or subclasses. For example, in one or more cases, the structured data management system 100 can have a class defining the user preferences of a user account. In some implementations, the user preferences class can have subclasses that define the specific attributes of the user preferences. For example, the structured data management system 100 can generate subclasses corresponding to working hours, work locations, personal information, working dates, usernames, etc. In one or more cases, the structured data management system 100 can cluster or classify one or more persisted data elements according to subclass. In some implementations, a subclass can correspond to a data model. As described above, if the structured data management system 100 receives data related to a user preference that is not reflected in the sub-class, the structured data management system 100 can generate a new sub-class (or data model) to include within the user preference class. Additionally, in one or more embodiments, the structured data management system 100 can receive one or more labels to the persisted data elements within the interpreter data store 202.

Figure 3:
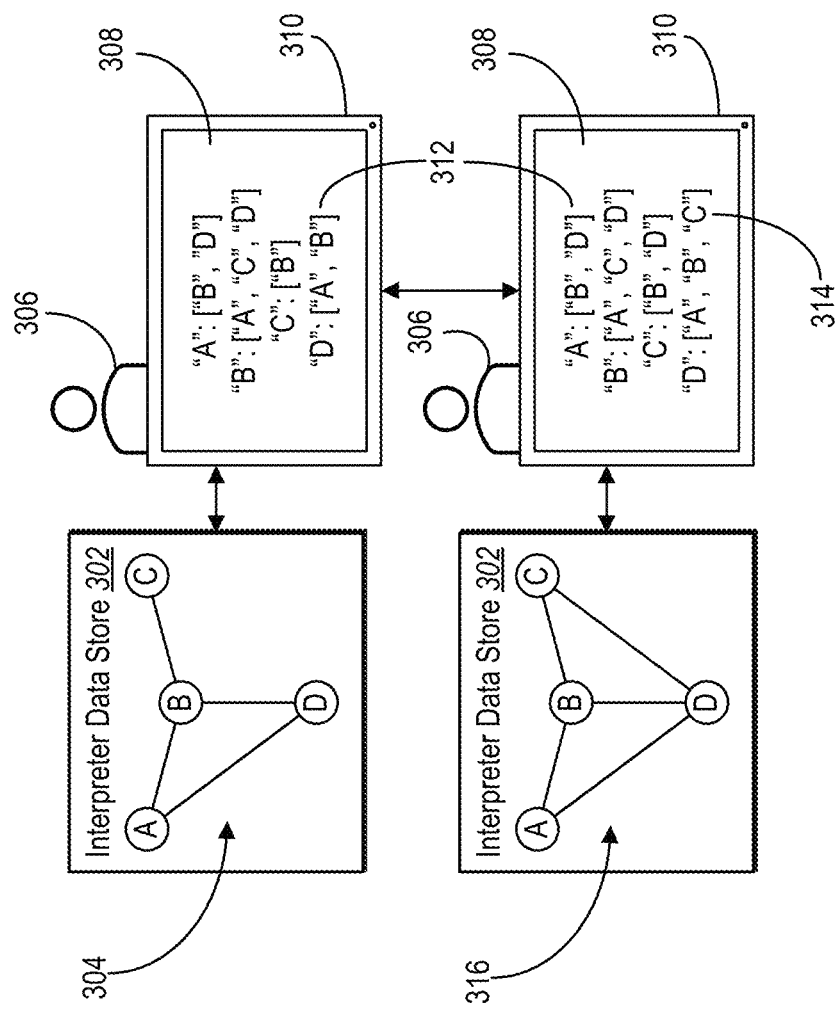
FIG. 3 illustrates the structured data management system receiving a modification to an element graph in accordance with one or more embodiments.

As mentioned above, the structured data management system 100 can modify one or more persisted data elements. FIG. 3 illustrates the structured data management system receiving a modification to an element graph in accordance with one or more embodiments.

As shown in FIG. 3, the structured data management system 100 can generate an element graph 304 comprising a plurality of persisted data elements within the interpreter data store 302. In some implementations, the persisted data elements are serialized data elements. In one or more embodiments, the structured data management system 100 can receive a request (or query) from a client device 310 associated with a user account 306 to access one or more persisted data elements within the element graph 304 and/or the interpreter data store 302. For example, the structured data management system 100 can request a list of quarterly budgets for marketing campaigns. In one or more implementations, the structured data management system 100 can access a list (or plurality) of persisted data elements representing the list of quarterly budgets for the marketing campaigns within the interpreter data store 302 and deserialize the plurality of persisted data elements.

As shown in FIG. 3, in one or more cases, the structured data management system 100 can provide for display on the graphical user interface 308 (e.g., large language model interface) of the client device 310 the list of quarterly budgets as a deserialized element graph 312. In some cases, like the structure of the persisted data elements, the structure (or format) of data elements within the deserialized element graph 312 can be structured data, such as, but not limited to, CSV, JSON, or XML. FIG. 3 illustrates that the structured data management system 100 can receive a modification 314 to the deserialized element graph 312 via a large language model interface. In particular, the structured data management system 100 can receive a user input directly modifying the relationship of the data element "D". For example, the structured data management system 100 can receive the modification 314, indicating that data element "D" is connected to data element "C." In some cases, the modification 314 can modify a value of element "D." Accordingly, in one or more implementations, the structured data management system 100 can serialize the modified data element and generate an updated (or modified) persisted data element. In some cases, the structured data management system 100 can receive one or more user interactions modifying any number of persisted data elements. For example, the structured data management system 100 can receive one or more user interactions modifying a subset of persisted data elements from among a plurality of persisted data elements that comprise sets of parameters.

Moreover, as shown in FIG. 3, the structured data management system 100 can generate an updated element graph 316 that reflects the modification 314 received from the user. Indeed, the structured data management system 100 can receive one or more user interactions to add, remove, and/or edit persisted data elements within the element graph 304 and/or the interpreter data store 302. In some embodiments, the structured data management system 100 can automatically update the values and/or relationships of one or more persisted data elements within the interpreter data store 302.

In some embodiments, the structured data management system 100 can receive one or more user interactions (e.g., queries) requesting to export one or more persisted data elements within the interpreter data store 302. For example, the structured data management system 100 can receive a query requesting a CSV file of telephone numbers for contacts saved within the interpreter data store 302. In one or more cases, the structured data management system 100 can generate the CSV file and export the CSV file to the client device 310. In some implementations, the structured data management system 100 can receive via the client device 310 one or more user interactions from the client device 310 associated with the user account 306 modifying one or more data elements (or fields) within the CSV file. In some cases, the structured data management system 100 can receive an import of the modified CSV file and generate one or more modified (or updated) persisted data elements based on importing the modified CSV file.

In some cases, the structured data management system 100 can receive one or more modifications via the large language model. For example, the structured data management system 100 can receive a request for persisted data elements or a specific data model via the large language model. For example, the structured data management system 100 could receive a query requesting the large language model to retrieve a list of birthdays from a list of contacts. In one or more embodiments, the structured data management system 100 can unserialize the persisted data elements representing the list of birthdays and provide the list of data elements (e.g., birthdays) for display on the graphical user interface 308 to the client device 310. In one or more cases, the structured data management system 100 can receive an additional query instructing the large language model to correct a given birthday of a given contact. As described above, the structured data management system 100 can update the data element associated with the given birthday, serialize the updated data element, and store an updated persisted data element in the interpreter data store 302. Indeed, the structured data management system 100 can modify one or more persisted data elements through natural language processing. In some cases, the structured data management system 100 can persist and/or update persisted data elements for permitted data models. For example, the structured data management system 100 can receive one or more user inputs indicating that the structured data management system 100 should only update persisted data elements associated with sensitive data.

Figure 4:
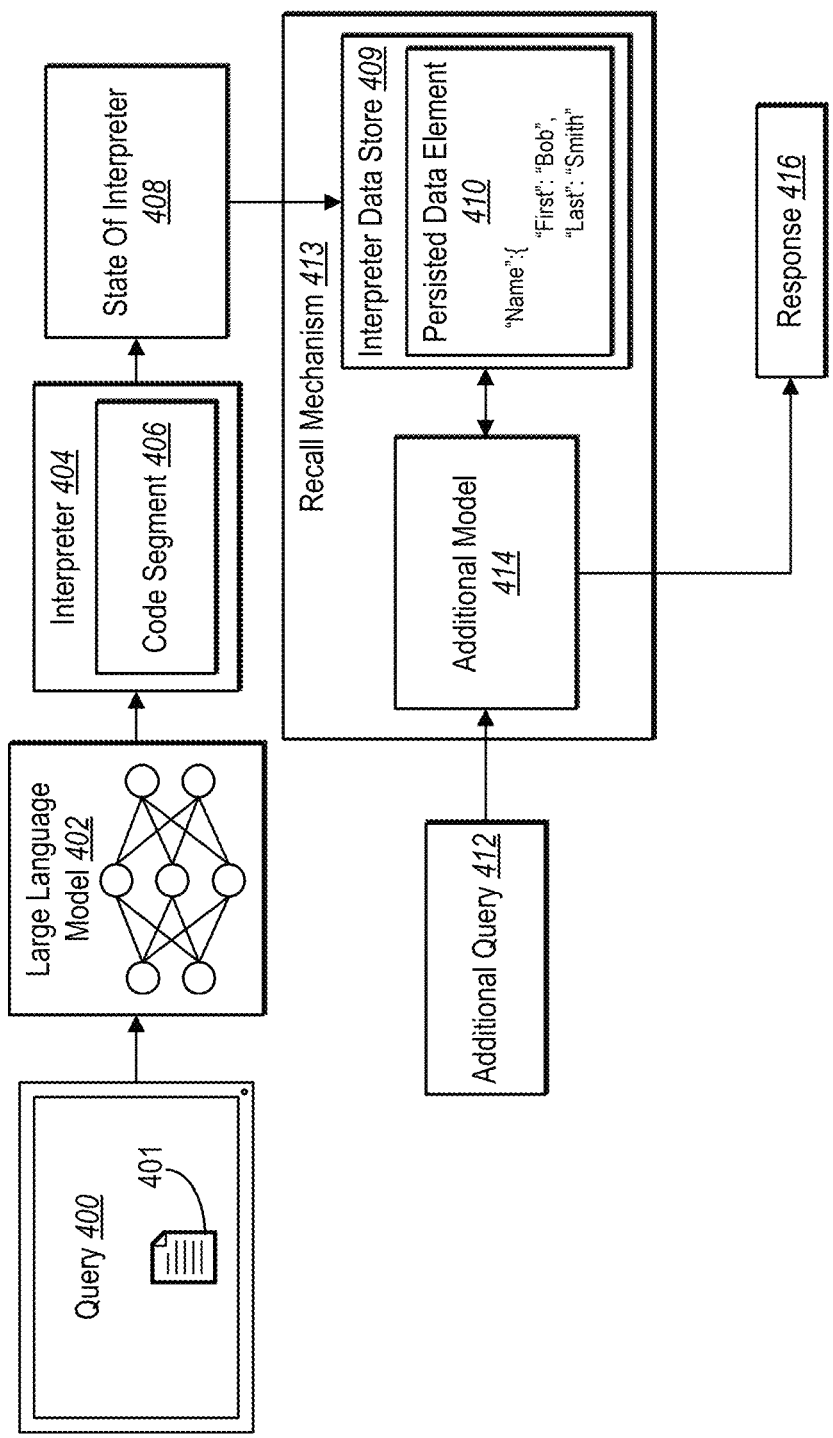
FIG. 4 illustrates a structured data management system generating a response to a query using an additional model in accordance with one or more embodiments.

As mentioned above, the collection of structured data (e.g., plurality of persisted data elements within an interpreter data store 302) can be utilized by various models and/or agents. For example, the concrete values of the persisted data elements can allow lighter large language models, which might process information differently, to access, process, and/or utilize the data (e.g., values) associated with the persisted data elements while generating a response to a query. FIG. 4 illustrates the structured data management system 100 generating a response to a query using an additional large language model in accordance with one or more embodiments.

As shown in FIG. 4, the structured data management system 100 can receive a query 400 from a client device associated with a user account. As previously indicated, the query 400 can request a large language model 402 to perform a variety of tasks. For example, the query 400 can request the large language model 402 to extract and/or store information from a source content item 401 as part of an ingestion phase. In particular, the structured data management system 100 can generate one or more persisted data elements from the source content item 401 by converting the native structure of the source content item 401 to a fixed data structure. To further illustrate, in some cases, the source content item 401 can be a transcript of a video that includes references to different contacts. The query 400 can request the large language model 402 to extract the contact names and store the contact names in the interpreter data store. As part of extracting the contact names from the transcript of the video, the structured data management system 100 can convert the unstructured format of the transcript to a Python dictionary with string sequences. In one or more implementations, the structured data management system 100 can use various source content items to perform the task associated with the query 400.

As described above, the structured data management system 100 can generate a prompt instructing the large language model 402 to generate computer code to perform the given task. As shown in FIG. 4, the structured data management system 100 can generate a code segment 406 executable by the interpreter 404. As shown in FIG. 4, the structured data management system 100 can determine a state 408 of the interpreter 404 as it generates data elements and/or outputs. As described above, the structured data management system 100 can serialize and store the state 408 of the interpreter 404 in an interpreter data store 409. Due to the concrete structure of the state 408 of the interpreter 404, the structured data management system 100 can generate a persisted data element 410.

As FIG. 4 illustrates, the structured data management system 100 can receive an additional query 412 requesting an additional model 414 to perform an additional task. In some cases, the additional model 414 can be an additional large language model that differs from the large language model 402. For example, the architecture, training data, capabilities, size, context window, etc., of the additional model 414 can differ from the architecture, training data, capabilities, size, context window, etc., of the large language model 402.

As shown in FIG. 4, the structured data management system 100 can utilize a recall mechanism 413 for accessing and/or pulling the persisted data element 410, one or more additional persisted data elements, and/or other information to generate a response 416. In some cases, the recall mechanism 413 can be a prompt (e.g., recall prompt), recall example function, and/or programmatic code instructing the large language model 402, the interpreter 404, and/or additional model 414 to access the persisted data element 410, one or more additional persisted data elements, and/or other information relevant to the additional query 412 to generate a response 416. For example, the recall mechanism 413 can pull the persisted data element 410 from the interpreter data store 409 and/or pull data from a memory store or database separate from the interpreter data store 409.

In some cases, the structured data management system 100 can access and unserialize the persisted data element 410 and use a variable of the corresponding data element to generate a response 416. In some cases, the structured data management system 100 does not utilize pre-processing steps to pull and/or analyze the persisted data element 410 with the additional query 412. Additionally, in one or more cases, the structured data management system 100 can use non-artificial intelligence-based models and/or automation to analyze the data associated with the persisted data element 410. For example, the additional model might utilize formulas, rule-based algorithms, or explicit instructions.

Alternatively, in one or more cases, the structured data management system 100 can adapt the persisted data element to the additional model 414 by modifying the fixed data structure of the persisted data element 410. For example, the structured data management system 100 can determine a structure associated with the additional model 414. In one or more embodiments, the structured data management system 100 can modify the fixed data structure of the persisted data element 410 to align or be compatible with the structure of the additional model 414 by generating an additional fixed data structure for the persisted data element. In some cases, the structured data management system 100 can process the persisted data element and generate a response to the additional query 412 based on the additional fixed data structure of the persisted data element.

Relatedly, in some cases, the structured data management system 100 can utilize the persisted data element with the additional fixed data structure in additional computer code (or an additional computer code segment) that is executable by an agent. For example, the additional model 414 and/or additional agent can process computer code differently than the interpreter 404. Accordingly, the structured data management system 100 can utilize a context engine connected to the additional model 414 to generate additional computer code with the persisted data element with the additional fixed data structure that corresponds to the additional model.

As mentioned above, the structured data management system 100 can utilize the additional model 414 to retrieve the persisted data element 410. In some cases, the structured data management system 100 can retrieve the persisted data element 410 for a subsequent session (or instance) with the large language model 402. For example, in some cases, the structured data management system 100 can receive a subsequent query from a client device and pull the persisted data element 410 to use while generating a subsequent response to the subsequent query.

In one or more cases, the structured data management system 100 can generate a subsequent (or additional prompt) with a context engine. In some embodiments, based on the content of the subsequent query, the structured data management system 100 can utilize the recall mechanism 413 to include one or more example functions and/or parameters instructing the large language model to include or look for one or more data models. For example, the structured data management system 100 can receive the subsequent query "Remind me to send an email about Project Bluesky to Bob next Monday." In one or more cases, based on the subsequent query, the structured data management system 100 can utilize the context engine to determine one or more data models necessitated by the query. For example, the context engine can determine that the prompt needs to include one or more example functions for pulling an email data model, a name data model, timeblock data model, date data model, etc.

Additionally, in some cases, the additional prompt can further include instructions to determine and/or identify the fixed data structures defined by the data models and/or the data types of the persisted data elements. For example, the structured data management system 100 can determine that the structure for the email data model for a set of persisted data elements can be a Python string sequence. In some cases, the data model can include various data types. For example, a contact data model can include a Python string sequence for a name and an integer for the age of the contact. Relatedly, the structured data management system 100 can determine which parameter or value of the parameter to access and/or retrieve from the interpreter data store based on the fixed structure of the data model of the persisted data element. For example, if a parameter of the persisted data element corresponds to a subclass (e.g., email data model) of a contact class, the structured data management system 100 can instruct the large language model 402 to access the email address (e.g. parameter) of the persisted data element.

In one or more embodiments, the structured data management system 100 can provide the subsequent prompt to the large language model 402 where the large language model 402 can generate an additional code segment (e.g., computer code) executable by the interpreter 404. In one or more embodiments, the additional code segment can include a set of data elements corresponding to the relevant persisted data elements and the interpreter 404 can access the relevant data to generate the reminder (or pop-up notification) indicating that the user account should email Bob about Project Bluesky.

In some cases, the structured data management system 100 can hardcode or define how the interpreter 404 can pull and/or utilize a parameter of the persisted data element that corresponds to a common data model and/or commonly performed task. For example, in some embodiments, the structured data management system 100 can receive a query requesting to schedule a meeting. In one or more embodiments, based on the hardcoding of scheduling a meeting within the interpreter 404, the interpreter can automatically access and/or pull one or more persisted data elements corresponding to a calendar data model of the user account and set up a default 30-minute meeting during a free period within the working hours of the user account. As discussed below, the structured data management system 100 can utilize a RAG framework to access persisted data elements.

Figure 5:
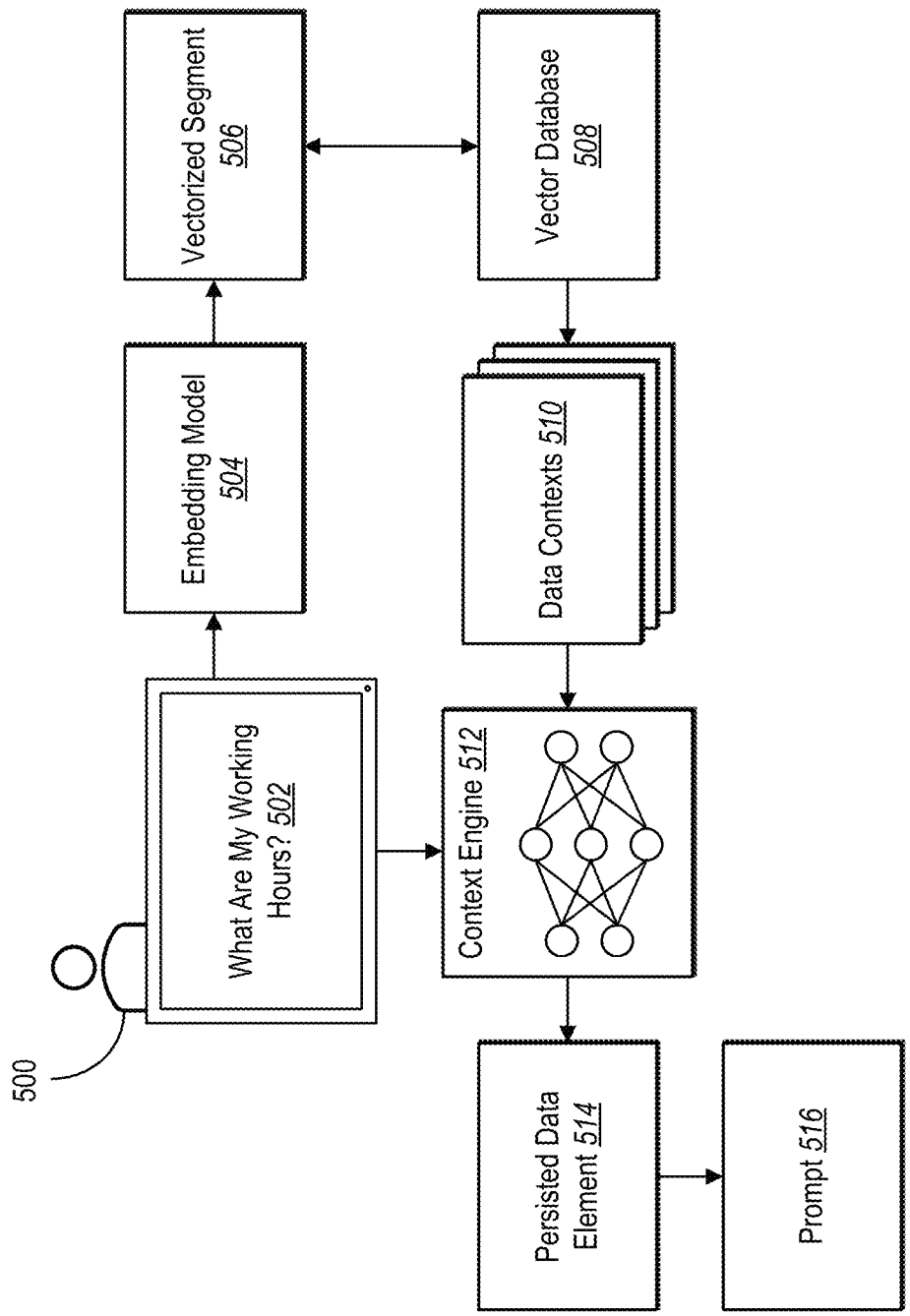
FIG. 5 illustrates a structured data management system using a retrieval-augmented generation (RAG) framework to retrieve a persisted data element in accordance with one or more embodiments.

As described above, the structured data management system 100 can utilize one or more persisted data elements for efficient and flexible data management and response generation. As described above, the structured data management system 100 can utilize a context engine to generate a prompt instructing a large language model to pull one or more persisted data elements and generate a code segment (or computer code) executable by an interpreter. In some embodiments, the structured data management system 100 can utilize a retrieval-augmented generation (RAG) framework to generate a response. FIG. 5 illustrates the structured data management system 100 using a RAG framework to retrieve a persisted data element in accordance with one or more embodiments.

As shown in FIG. 5, the structured data management system 100 can receive a query 502 reading "What are my working hours?" from a client device associated with a user account 500. As further shown in FIG. 5, in some embodiments, the structured data management system 100 can generate a query embedding 506 (or query vector) by inputting the query 502 into an embedding model 504. In some cases, the embedding model 504 can generate a vector (or embedding) reflecting the semantic, relational, and/or textual meaning of the query 502. In some cases, the structured data management system 100 can generate a plurality of vectors representing the query 502.

As further shown in FIG. 5, the structured data management system 100 can store one or more embeddings (or vector segments) in a vector database 508. In particular, the structured data management system 100 can store embeddings for various types of content items in the vector database 508. FIG. 5 further shows the structured data management system 100 generating one or more data contexts 510. In particular, the structured data management system 100 can determine which persisted data elements and/or content items to feed into the context engine 512 to add to a prompt 516. For example, the structured data management system 100 can compare the query embedding 506 with content embeddings (e.g., vectorized segments of content items), user account embeddings, relationship embeddings, etc., stored in the vector database 508 to determine information (or data) that is relevant to the query 502.

As shown in FIG. 5, based on the comparison, the structured data management system 100 can generate one or more data contexts 510 indicating that the structured data management system 100 and/or context engine 512 should pull one or more persisted data elements (or source content items) related to the working hours corresponding to the user account 500 while generating the prompt 516. For example, based on the one or more data contexts 510 indicating that the context engine 512 should pull the persisted data element 514 corresponding to a start time, the context engine 512 can include the persisted data element 514 in the prompt 516 along with one or more example functions related to determining the working hours for the user account 500.

As described above, in one or more embodiments, the structured data management system 100 can provide the prompt 516 to a large language model to generate computer code and/or a code segment. In some cases, the structured data management system 100 can use multiple calls to the context engine, large language model, and/or agent to pull relevant data (e.g., persisted data elements) and generate a response to the query 502. For example, the structured data management system 100 can utilize a first call to a large language model to pull the relevant data (e.g., persisted data elements). In one or more embodiments, the structured data management system 100 can use a second call to the large language model to take the relevant data and generate the computer code (or code segment).

Figure 6:
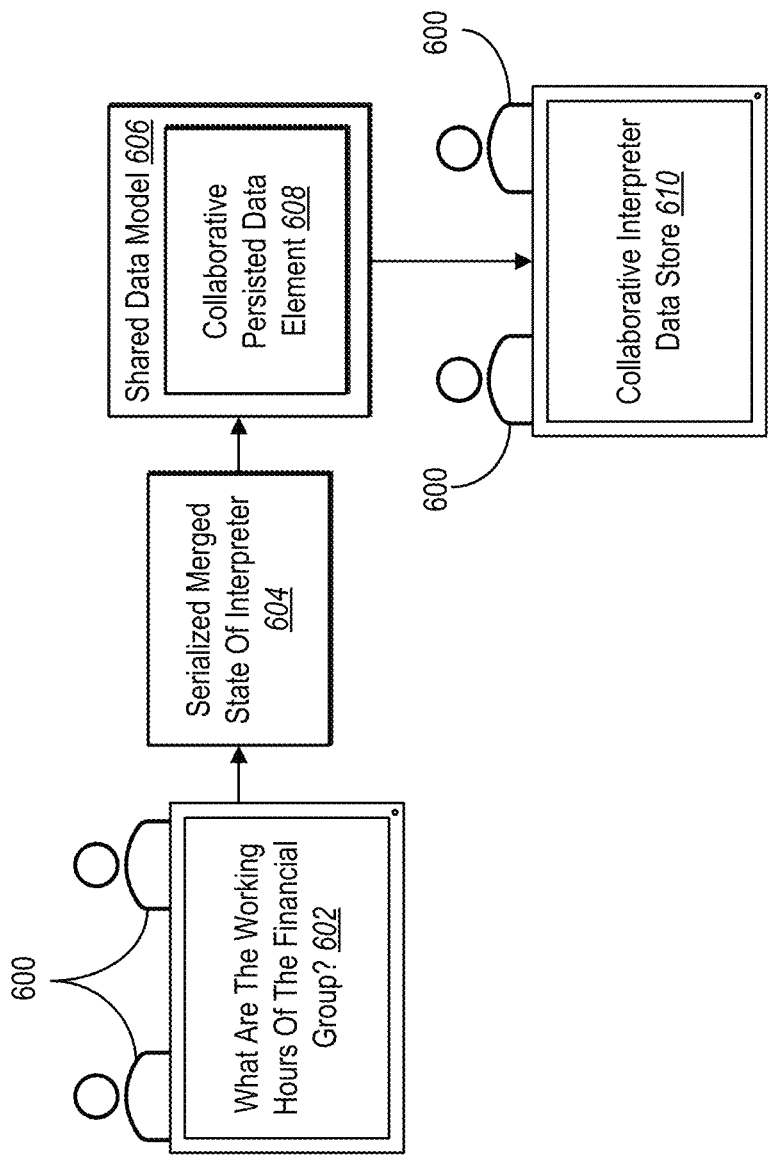
FIG. 6 illustrates a structured data management system generating and storing a collaborative persisted data element in accordance with one or more embodiments.

As discussed above, the structured data management system 100 can generate a collection of persisted data elements for a user account. In some cases, the structured data management system 100 can generate a collaborative persisted data element and/or a collection (or plurality) of persisted data elements for a plurality of collaborative user accounts. FIG. 6 illustrates the structured data management system 100 generating and storing a collaborative persisted data element in accordance with one or more embodiments.

As shown in FIG. 6, the structured data management system 100 can detect a collaborative session of a large language model where a plurality of collaborating user accounts 600 can interact with the large language model. In some cases, the collaborative session can be an initial instance with the large language model or a subsequent (or following) instance with the large language model. In some cases, if the collaborative session with the large language model is the initial session, the structured data management system 100 can generate an initial merged state of an interpreter associated with the initial collaborative session. In one or more embodiments, the structured data management system 100 can generate a merged state of an agent associated with the collaborative session of the large language model by combining individual sessions of the plurality of collaborative users with the large language model as described in James Johnson et al. in U.S. patent application Ser. No. 19/199,024, titled FACILITATING A COLLABORATIVE SESSION OF A LARGE LANGUAGE MODEL FOR A PLURALITY OF USERS, filed on May 5, 2025, which is hereby incorporated by reference in its entirety.

Moreover, the structured data management system 100 can serialize the merged state of the interpreter and store a serialized merged state of the interpreter 604 in a database. In some cases, the structured data management system 100 can generate and/or pull one or more collaborative persisted data elements from the serialized merged state of the interpreter 604 described above in FIG. 1 and store the one or more collaborative persisted data elements in a collaborative interpreter data store.

In some cases, the structured data management system 100 can identify or determine the one or more collaborative persisted data elements by combining one or more persisted data elements associated with individual collaborating user accounts and/or individual states of the interpreter (or individual sessions of the large language model). For example, during a first session of a first collaborating user account with the large language model, the structured data management system 100 can determine the working hours (8:00 AM-5:00 PM) for a manager of the financial group. In one or more cases, the structured data management system 100 can serialize and store a first state of the interpreter associated with the first session of the large language model and save the working hours for the manager as a first persisted data element. Additionally, during a second session of a second collaborating user account with the large language model, the structured data management system 100 can determine the working hours (2:00 PM-6:00 PM) for a part-time member of the financial group. The structured data management system 100 can serialize and store a second state of the interpreter associated with the second session of the large language model and save the working hours for the part-time member as a second persisted data element. Upon detecting a collaborative session with the first collaborating user account and the second collaborating user account, the structured data management system 100 can merge the first state of the interpreter and the second state of the interpreter. In some cases, the structured data management system 100 can serialize the merged state of the interpreter according to the methods described above in FIG. 1. Based on the merged state of the interpreter, the structured data management system 100 can generate collaborative persisted data elements by pulling in the first persisted data element associated with the first state of the interpreter and the second persisted data element associated with the second state of the interpreter.

As mentioned above, in some cases, the collaborative session can be a subsequent instance of plurality of collaborating user accounts with the large language model. Accordingly, during the subsequent instance of the large language model in the collaborative session, the structured data management system 100 can receive a query reading "What are the working hours of the financial group?" In one or more cases, the structured data management system 100 can generate computer code (or code segment) that pulls and processes the first collaborative persisted data element and the second collaborative persisted data element to generate an output or collaborative data element indicating that the working hours of the financial group range from 8:00 AM-6:00 PM. In some implementations, the structured data management system 100 can generate the collaborative persisted data element 608 representing the 8:00 AM-6:00 PM working hours for the financial group by serializing the collaborative data element.

In some cases, the structured data management system 100 can detect a shared data model for the collaborative persisted data element 608 (or one or more collaborative persisted data elements). As described above, the structured data management system 100 can determine the shared data model 606 by receiving one or more user interactions defining the shared data model for the collaborative persisted data element 608. Additionally, in some cases, the structured data management system 100 can determine the shared data model 606 by associating the collaborative persisted data element 608 with the serialized merged state of the interpreter. In some cases, the structured data management system 100 can generate a unique fixed structure for the shared data model 606 from data models described above to indicate the shared status of the collaborative persisted data element 608 across the plurality of collaborating user accounts.

As shown in FIG. 6, the structured data management system 100 can store the collaborative persisted data element 608 in a collaborative interpreter data store 610. In some cases, different collaborating user accounts store and/or manage data (e.g., persisted data elements) differently. For example, a first collaborating user can use a first format for persisted data elements and a second collaborating user can employ a second format for persisted data elements that both share the same data model. In some instances, the structured data management system 100 can utilize a large language model and/or machine learning model to process and/or resolve formatting differences of data that share the same data model.

Additionally, as indicated, in one or more embodiments, each collaborating user account will have private or secure persisted data elements. In some cases, as the structured data management system 100 merges states of the interpreter and generates the collaborative persisted data element 608, the structured data management system 100 can associate one or more permissions with specific persisted data elements and/or data models of the persisted data elements. For example, the structured data management system 100 can receive one or more user interactions indicating that persisted data elements associated with personal identifying information (PII) data model should not be shared without a given permission.

Relatedly, based on the one or more permissions, the structured data management system 100 can generate a memory wall within the interpreter data store and generate isolated interpreter data store locations separating private and/or sensitive information (e.g., persisted data elements) from public information (e.g., persisted data elements). In some cases, the structured data management system 100 can generate multiple interpreter data stores for a user account where a first interpreter data store stores a first set of persisted data elements associated with a private and/or secure data model (e.g., medical records). In one or more embodiments, user accounts with permissions (e.g., passwords, login credentials) can access the first set of persisted data elements. Additionally, the structured data management system 100 can generate a second interpreter data store for the user account that stores persisted data elements associated with public data models (e.g., business addresses). In some implementations, any user account can access the second set of persisted data elements. Indeed, the structured data management system 100 can receive one or more user interactions indicating how, when, where, and who can access persisted data elements according to data model and/or permissions.

In some cases, the structured data management system 100 can associate certain data models (e.g., medical records, legal information, genetic data, etc.) with a security level and automatically place privacy settings on persisted data elements associated with such data models. For example, in some cases, the structured data management system 100 can encrypt persisted data elements associated with a medical record data model. In some cases, the structured data management system 100 can request a password from a client device associated with a user account (or collaborative user account) to access and/or share persisted data elements associated with legal information.

Additionally, in one or more embodiments, the structured data management system 100 can determine that a private persisted data element associated with the first collaborating user account can provide more context and/or an answer to the query 602. In one or more embodiments, the structured data management system 100 can request permission to share the value associated with the persisted data element with the second collaborating user account. In some cases, the structured data management system 100 can share the private persisted data element for a given period of time. For example, upon detecting a termination of the collaborative session, the structured data management system 100 can revoke access to the private persisted element from the second collaborating user account.

Figure 7:
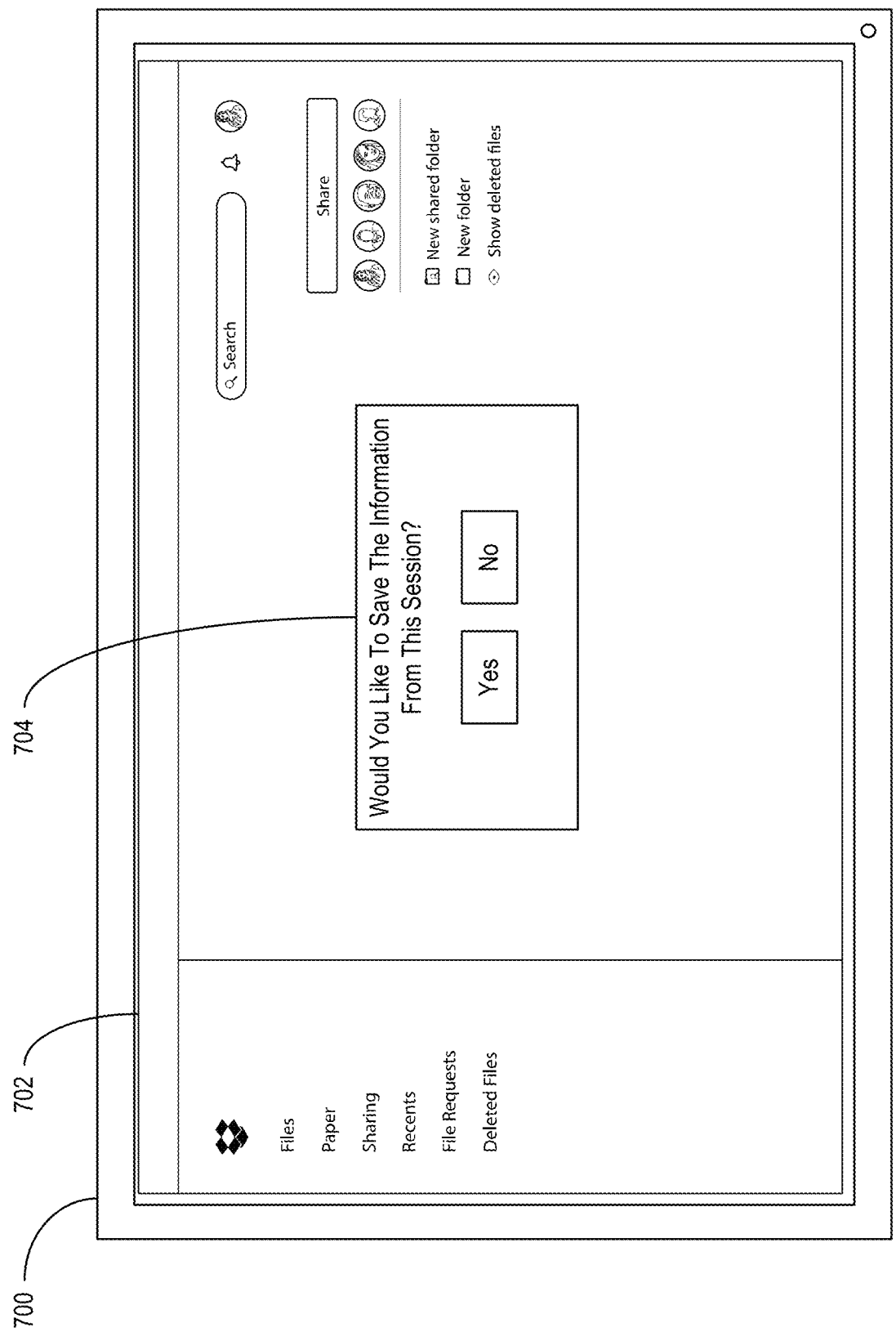
FIG. 7 illustrates an exemplary graphical user interface of a save notification associated with a session of a large language model in accordance with one or more embodiments.

In one or more embodiments, the structured data management system 100 can provide one or more notifications about saving persisted data elements. FIG. 7 illustrates an exemplary graphical user interface of a save notification associated with a session of a large language model in accordance with one or more embodiments.

As shown in FIG. 7, during a session with the large language model, the structured data management system 100 can provide for display on a graphical user interface 702 of a client device 700 a save notification 704 reading "Would you like to save the information from this session?" In some cases, the structured data management system 100 can generate a lot of data during the session with the large language model. In some cases, as the session with the large language model ends, the structured data management system 100 can provide for display on the graphical user interface 702 of the client device 700, the save notification 704 indicating that certain data models of the persisted data elements, states of the interpreter, prompts, responses, can be stored in an interpreter data store. For example, in some cases, the save notification 704 can indicate that one or more (e.g., set of) states of the interpreter associated with a session of the large language model will be serialized and stored if the structured data management system 100 receives one or more user inputs indicating permission to save the one or more states of the interpreter. In one or more embodiments, the structured data management system 100 can receive one or more user interactions indicating permission to save the one or more states of the interpreter and save the one or more states of the interpreter based on the one or more user interactions.

Additionally, in some cases, the structured data management system 100 can receive one or more privacy and/or security settings outlined by policies associated with an entity (e.g., corporation). In one or more implementations, the structured data management system 100 can automatically save, update, encrypt, etc., one or more persisted data elements associated with the entity (e.g., stored in a database of the entity) according to the policies defined by the entity. For example, in some cases, entity policy can outline that the structured data management system 100 never saves social security numbers of clients. In one or more cases, if a member account (or user account) utilizes social security numbers during a session with the large language model, the structured data management system 100 will not store the social security numbers as persisted data elements within the interpreter data store of the member account because that would conflict with the policies of the entity.

In some cases, the save notification 704 can indicate that the structured data management system 100 will store one or more specific data models and one or more selectable elements for redacting or deleting one or more data models from the interpreter data store. In one or more embodiments, the structured data management system 100 can receive an indication of a selection of a selectable data element to redact one or more persisted data elements associated with a credit card data model. To further illustrate, the structured data management system 100 can receive one or more user interactions instructing the large language model to delete a specified data model (e.g., social security number data model) from the interpreter data store. Based on the one or more user interactions, the structured data management system 100 can delete the data (e.g., state of the interpreter, persisted data elements, prompts, etc.) from the interpreter data store and/or other databases storing such information.

In one or more cases, the save notification 704 can provide an overview of the data models the structured data management system 100 saved, encrypted, password protected, deleted, and/or redacted. In some cases, the structured data management system 100 can receive one or more user interactions modifying the treatment of specific data models. For example, the structured data management system 100 can receive one or more user interactions, indicating that a birth date list no longer needs password protections. In some cases, the save notification 704 can indicate that the structured data management system 100 did not save any data associated with a specific data model or for a given session with the large language model.

FIGS. 1-7, the corresponding text, and the examples provide a number of different systems and methods for generating, storing, and accessing a persisted data element. In addition to the foregoing, implementations can also be described in terms of flowcharts comprising acts/steps in a method for accomplishing a particular result. For example, FIG. 8 illustrates an example series of acts performed by the structured data management system 100 in accordance with one or more embodiments.

Figure 8:
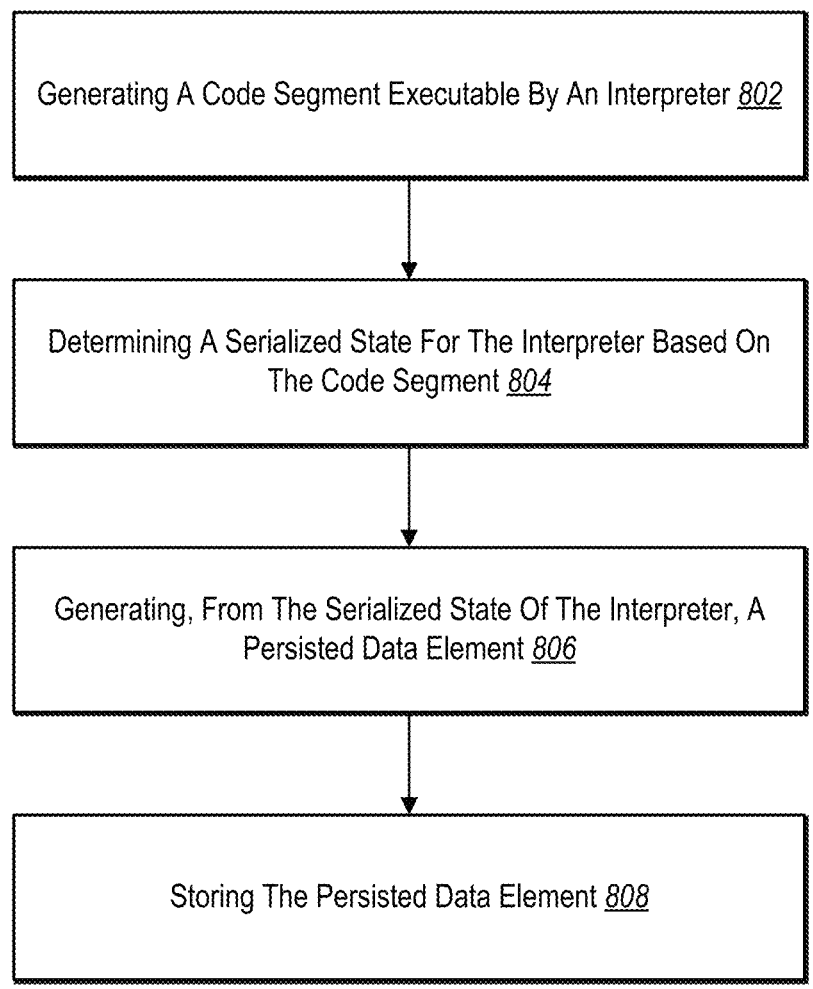
FIG. 8 illustrates an example series of acts performed by the structured data management system in accordance with one or more embodiments.

While FIG. 8 illustrates acts according to certain implementations, alternative implementations may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further implementations, a system can perform the acts of FIG. 8.

As illustrated in FIG. 8, a series of acts 800 may include an act 802 of generating a code segment executable by an interpreter, an act 804 of determining a serialized state for the interpreter based on the code segment, an act 806 of generating, from the serialized state of the interpreter, a persisted data element, and an act 808 of storing the persisted data element.

In particular, the act 802 includes generating, using a large language model associated with a context engine, a code segment comprising a set of parameters and a function executable by an interpreter associated with the context engine. Further, the act 804 includes determining a serialized state for the interpreter based on execution of the code segment. Moreover, the act 806 includes generating, from the serialized state of the interpreter, a persisted data element comprising a fixed data structure corresponding to at least one parameter from among the set of parameters. Additionally, the act 808 includes storing the persisted data element in an interpreter data store.

Further, in one or more embodiments, the series of acts 800 includes generating an element graph comprising nodes representing a plurality of persisted data elements extracted from the serialized state of the interpreter. Additionally, in one or more embodiments, the series of acts 800 includes clustering the plurality of persisted data elements into a plurality of data models. In some cases, the series of acts 800 can include updating the element graph based on an additional code segment comprising an additional set of parameters.

Moreover, in one or more embodiments, the series of acts 800 includes receiving a query from a client device associated with a user account. Furthermore, in one or more embodiments, the series of acts 800 includes generating, from the query, an additional code segment comprising an additional set of parameters executable by the interpreter. Additionally, in one or more embodiments, the series of acts 800 includes determining an additional state for the interpreter based on the additional set of parameters defined by the additional code segment. Further, in one or more embodiments, the series of acts 800 includes determining, from the additional state of the interpreter, a new data model for an additional persisted data element.

Moreover, in one or more embodiments, the series of acts 800 includes processing with the large language model one or more source content items during an ingestion phase. Further, in one or more embodiments, the series of acts 800 includes generating, from the one or more source content items, one or more persisted data elements by converting a native structure of the one or more source content items to the fixed data structure.

Moreover, in one or more embodiments, the series of acts 800 includes accessing, via the large language model, an element graph comprising a plurality of persisted data elements stored within the interpreter data store. Further, in one or more embodiments, the series of acts 800 includes providing, for display in a graphical user interface of a client device, the element graph comprising the plurality of persisted data elements comprising sets of parameters. In some cases, the series of acts 800 can include receiving one or more user inputs modifying a subset of persisted data elements from among the plurality of persisted data elements. Further, in one or more embodiments, the series of acts 800 includes updating the element graph based on modifying the subset of persisted data elements.

Moreover, in one or more embodiments, the series of acts 800 includes providing, for display in a graphical user interface of a client device associated with a user account, a save notification requesting permission to store a set of serialized states of the interpreter during a session of the large language model. Further, in one or more embodiments, the series of acts 800 includes receiving, from the client device, one or more user interactions indicating permission to save the set of serialized states of the interpreter. In some cases, the series of acts 800 can include storing the set of serialized states of the interpreter for the session of the large language model based on receiving the one or more user interactions.

Additionally, in one or more embodiments, the series of acts 800 includes encrypting the persisted data element based on a data model of the persisted data element.

Moreover, in one or more embodiments, the series of acts 800 includes generating, using a large language model associated with a context engine, a plurality of code segments comprising a plurality of sets of parameters and a plurality of functions executable by an interpreter associated with the context engine. Further, in one or more embodiments, the series of acts 800 includes determining a serialized state for the interpreter based on the plurality of sets of parameters and the plurality of functions defined by the plurality of code segments. Additionally, in one or more embodiments, the series of acts 800 includes generating, from the serialized state of the interpreter, a plurality of persisted data elements comprising a fixed data structure corresponding to at least one parameter from among the plurality of sets of parameters. Moreover, in one or more embodiments, the series of acts 800 includes storing the plurality of persisted data elements in an interpreter data store.

Further, in one or more embodiments, the series of acts 800 includes generating an element graph comprising the plurality of persisted data elements for a user account, wherein the element graph comprises a plurality of nodes representing the plurality of persisted data elements and a plurality of edges representing relationships between the plurality of nodes. Further, in one or more embodiments, the series of acts 800 includes clustering the plurality of persisted data elements into data models. Furthermore, in one or more embodiments, the series of acts 800 includes updating the element graph with an additional node based on an additional code segment comprising an additional set of parameters.

Moreover, in one or more embodiments, the series of acts 800 includes detecting a collaborative session of the large language model, wherein a plurality of collaborating user accounts interact with the large language model. Further, in one or more embodiments, the series of acts 800 includes determining a serialized merged state for the interpreter corresponding to the collaborative session of the large language model. Moreover, in one or more embodiments, the series of acts 800 includes generating, from the serialized merged state of the interpreter, a collaborative persisted data element. In some cases, the series of acts 800 can include determining a shared data model for the collaborative persisted data element. Additionally, in some implementations, the series of acts 800 includes storing the collaborative persisted data element according to the shared data model.

Moreover, in one or more embodiments, the series of acts 800 includes receiving a query from a client device associated with a user account. Further, in one or more embodiments, the series of acts 800 includes generating, from the query utilizing the context engine, a prompt instructing the large language model to determine a data model necessitated by the query. Moreover, in some cases, the series of acts 800 can include determining the fixed data structure based on the data model.

Further, in one or more embodiments, the series of acts 800 includes determining a new data model indicated by a query for the large language model. Moreover, in one or more embodiments, the series of acts 800 includes determining, based on one or more historic sessions of the large language model, that the new data model is not reflected in persisted data elements within the interpreter data store. Moreover, in one or more embodiments, the series of acts 800 includes extracting, from the one or more historic sessions of the large language model, one or more persisted data elements corresponding to the new data model.

Further, in one or more embodiments, the series of acts 800 includes providing, for display via a large language model interface, a persisted data element from the plurality of persisted data elements. Further, in one or more embodiments, the series of acts 800 includes receiving one or more user inputs modifying the persisted data element. Furthermore, in one or more embodiments, the series of acts 800 includes updating the persisted data element based on modifying the persisted data element.

Moreover, in one or more embodiments, the series of acts 800 includes storing a first subset of persisted data elements corresponding to a first data model for a first period of time. Additionally, in one or more implementations, the series of acts 800 includes storing a second subset of persisted data elements corresponding to a second data model for a second period of time that differs from the first period of time.

Further, in one or more embodiments, the series of acts 800 includes generating, using a large language model associated with a context engine, a code segment comprising a set of parameters and a function executable by an interpreter associated with the context engine. Moreover, in one or more embodiments, the series of acts 800 includes determining a serialized state for the interpreter based on executing the code segment. Moreover, in one or more embodiments, the series of acts 800 includes generating, from the serialized state of the interpreter, a persisted data element comprising a fixed data structure corresponding to at least one parameter from among the set of parameters. Further, in one or more embodiments, the series of acts 800 includes determining a data model for the persisted data element. Further, in one or more embodiments, the series of acts 800 includes storing the persisted data element in an interpreter data store according to the data model.

Moreover, in one or more embodiments, the series of acts 800 includes generating, from the fixed data structure of the persisted data element, an additional fixed data structure for the persisted data element by modifying the fixed data structure of the persisted data element to align with a structure of an additional model. Further, in one or more embodiments, the series of acts 800 includes generating a response to a query using the additional model based on the additional fixed data structure of the persisted data element.

In some implementations, the series of acts 800 includes receiving a query from a client device associated with a user account. Moreover, the series of acts 800 can include generating an additional code segment comprising an additional set of parameters executable by the interpreter, wherein the additional code segment comprises the persisted data element from the interpreter data store. Furthermore, in one or more embodiments, the series of acts 800 includes generating a response based on executing the additional code segment.

In some implementations, the series of acts 800 includes receiving one or more user interactions instructing the large language model to delete data associated with a specified data model. Additionally, the series of acts 800 can include based on the one or more user interactions, deleting the data associated with the specified data model.

Further, the series of acts 800 can include receiving, during a collaborative session of the large language model, a query from a client device associated with a collaborating user account from a plurality of collaborating user accounts. Moreover, the series of acts 800 includes detecting, for the collaborative session of the large language model, that the data model of the persisted data element requires permission from the collaborating user account. Moreover, in some cases, the series of acts 800 includes determining that the persisted data element corresponds to the query. Additionally, the series of acts 800 includes requesting permission from the client device associated with the collaborating user account to provide the persisted data element to the large language model.

In one or more cases, the series of acts 800 includes receiving a query from a client device associated with a user account. In some implementations, the series of acts 800 includes generating a vectorized segment of the query. Moreover, in one or more embodiments, the series of acts 800 can include comparing the vectorized segment of the query with a plurality of vectorized segments of a plurality of content items stored in a vector database. Further, in some implementations, the series of acts 800 can include based on comparing the vectorized segment of the query with the plurality of vectorized segments, generating a prompt instructing the large language model to include the persisted data element in an additional code segment associated with the query.

Figure 9:
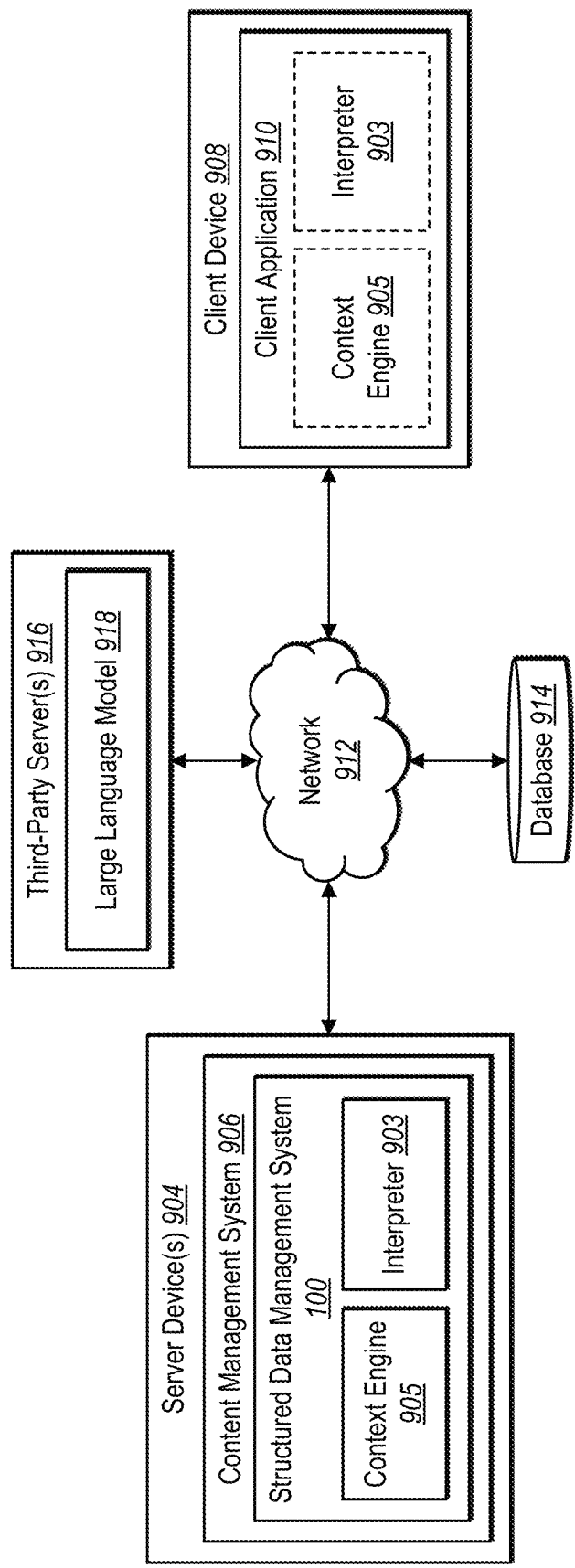
FIG. 9 illustrates a schematic diagram of an example environment of a structured data management system in accordance with one or more embodiments.

Additional detail regarding the structured data management system 100 will now be provided with reference to the figures. For example, FIG. 9 illustrates a schematic diagram of an example system environment for implementing a structured data management system 100 in accordance with one or more implementations. An overview of the structured data management system 100 is described in relation to FIG. 9.

As shown, the environment includes server(s) 904 with the structured data management system 100 that includes a context engine 905, which further includes an interpreter 903, a database 914, server(s) 916, and a client device 908. Each of the components of the environment can communicate via the network 912, and the network 912 may be any suitable network over which computing devices can communicate. Example networks are discussed in more detail below in relation to FIGS. 10-11.

As mentioned above, the example environment includes client device 908. The client device 908 can be one of a variety of computing devices, including a smartphone, a tablet, a smart television, a desktop computer, a laptop computer, a virtual reality device, an augmented reality device, or another computing device as described in relation to FIGS. 10-11. The client device 908 can communicate with the server(s) 904 via the network 912. For example, the client device 908 can receive user input from a user interacting with the client device 908 (e.g., via the client application 910) to, for instance, generate and/or modify a persisted data element or to select user interface elements for interacting with the content management system 906. In addition, the structured data management system 100 on the server(s) 904 can receive information relating to various interactions with source content items and/or user interface elements based on the input received by the client device 908.

As shown, the client device 908 can include a client application 910. In particular, the client application 910 may be a web application, a native application installed on the client device 908 (e.g., a mobile application, a desktop application, etc.), or a cloud-based application where all or part of the functionality is performed by the server(s) 904. Based on instructions from the client application 910, the client device 908 can present or display information, including a user interface for interacting with (or collaborating regarding) generating responses for a query in an individual session with a large language model or a query in a collaborative session with the large language model 918. Using the client application, the client device 908 can perform (or request to perform) various operations, such as defining a data model for a persisted data element and/or generating a response to a text query.

As illustrated in FIG. 9, the example environment also includes the server(s) 904. The server(s) 904 may generate, track, store, process, receive, and transmit electronic data, such as text queries, a serialized state of an interpreter, a persisted data element, computer code, interactions with interface elements, and/or interactions between user accounts or client devices. For example, the server(s) 904 may receive an indication from the client device 908 of a user interaction defining a text query. In addition, the server(s) 904 can transmit data to the client device 908 in the form of a response to a text query. Indeed, the server(s) 904 can communicate with the client device 908 to send and/or receive data via the network 912. In some implementations, the server(s) 904 comprise(s) a distributed server where the server(s) 904 include(s) a number of server devices distributed across the network 912 and located in different physical locations. The server(s) 904 can comprise one or more content servers, application servers, container orchestration servers, communication servers, web-hosting servers, machine learning server, and other types of servers.

As shown in FIG. 9, the server(s) 904 can also include the structured data management system 100 as part of a content management system 906. The content management system 906 can communicate with the client device 908 to perform various functions associated with the client application 910 such as managing user accounts and/or defining text queries. Indeed, the content management system 906 can include a network-based smart cloud storage system to manage, store, and maintain content items and related data across numerous user accounts. In some embodiments, the structured data management system 100 and/or the content management system 906 utilize the database 914 to store and access information such as content items, persisted data elements, data objects, code segments, computer code, prompts, text queries, results for text queries, responses to text queries, a merged state of the interpreter 903, a serialized state of the interpreter 903, and other information related to a state of the interpreter 903.

As further illustrated, the environment includes the server(s) 916 that hosts a large language model 918. In particular, the large language model 918 communicates with the server(s) 904, the client device 908, and/or the database 914. For example, the structured data management system 100 provides domain-specific language segments to the large language model 918, where the domain-specific language segments indicate a context of individual sessions of a plurality of collaborating user accounts with the large language model 918. Indeed, the large language model 918 can include a machine learning model powered by neural networks or other machine learning architectures for generating responses to text queries. For example, the large language model 918 can refer to a ChatGPT model that generates computer-executable code segments for accessing data sources to generate a context-aware response for a query.

Although FIG. 9 depicts the structured data management system 100 located on the server(s) 904, in some implementations, the structured data management system 100 may be implemented by (e.g., located entirely or in part on) one or more other components of the environment. For example, the structured data management system 100 may be implemented by the client device 908 and/or a third-party system. For example, the client device 908 and/or a third-party system can download all or part of the structured data management system 100 for implementation independent of, or together with, the server(s) 904. In some cases, the structured data management system 100 houses or hosts the large language model 918 together with the context engine 905 and the interpreter 903.

In some implementations, though not illustrated in FIG. 9, the environment may have a different arrangement of components and/or may have a different number or set of components altogether. For example, the client device 908 may communicate directly with the structured data management system 100, bypassing the network 912. In addition, the environment can include the database 914 located external to the server(s) 904 (e.g., in communication via the network 912) or located on the server(s) 904 and/or on the client device 908. In some cases, the server(s) 904 and/or the client device 908 can host or house all or part of the large language model 918.

The components of the structured data management system 100 can include software, hardware, or both. For example, the components of the structured data management system 100 can include one or more instructions stored on a computer-readable storage medium and executable by processors of one or more computing devices. When executed by one or more processors, the computer-executable instructions of the structured data management system 100 can cause a computing device to perform the methods described herein. Alternatively, the components of the structured data management system 100 can comprise hardware, such as a special purpose processing device to perform a certain function or group of functions. Additionally or alternatively, the components of the structured data management system 100 can include a combination of computer-executable instructions and hardware.

Furthermore, the components of the structured data management system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the structured data management system 100 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
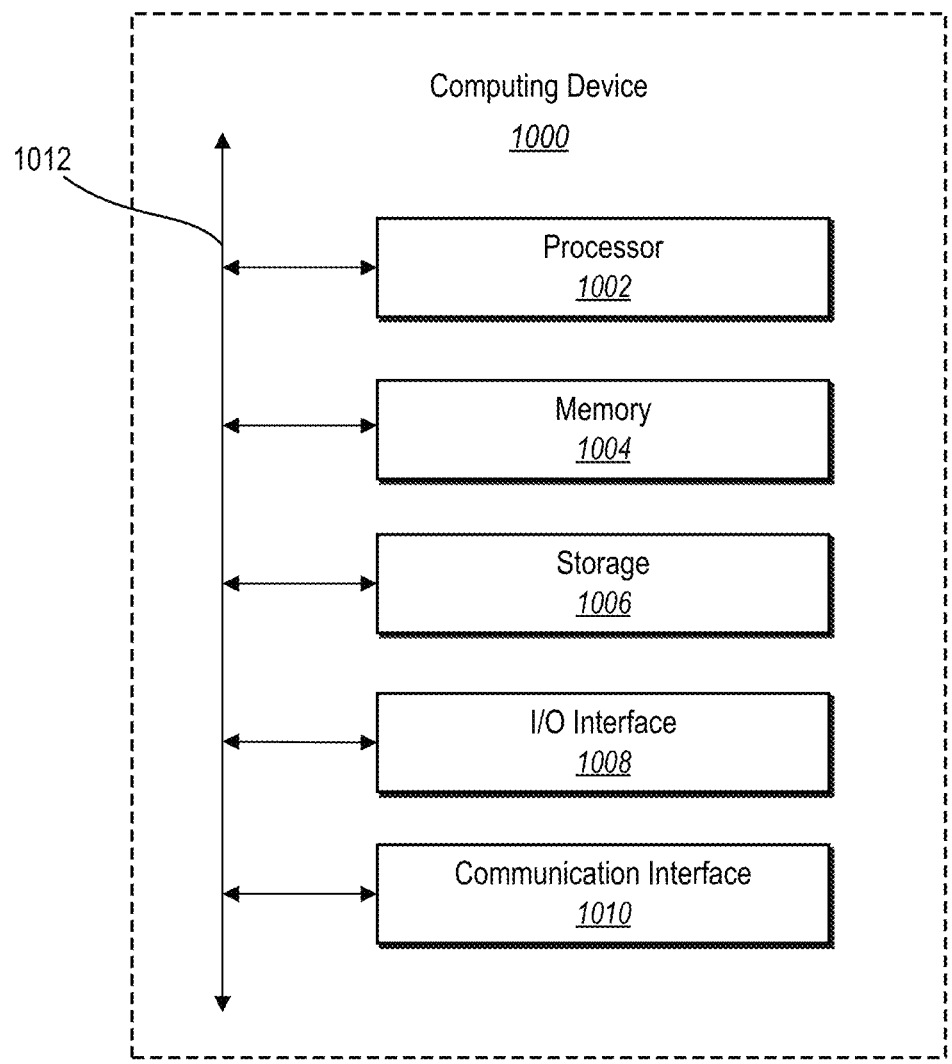
FIG. 10 illustrates a block diagram of an exemplary computing device in accordance with one or more embodiments.

FIG. 10 illustrates a block diagram of exemplary computing device 1000 (e.g., the server(s) 904, the server(s) 916, and/or the client device 908) that may be configured to perform one or more of the processes described above. One will appreciate that server(s) 904 and/or the client device 908 may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate.

Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
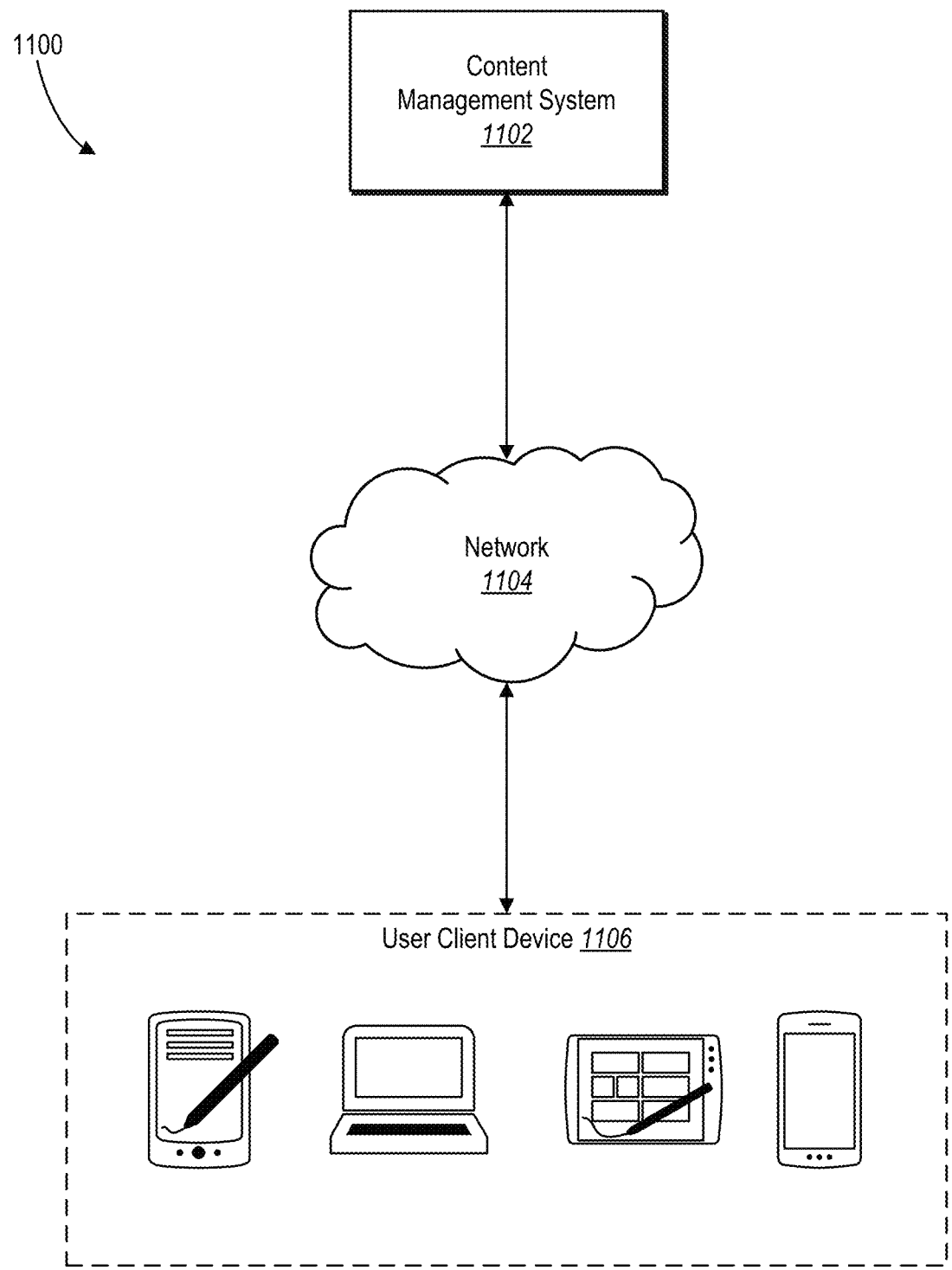
FIG. 11 illustrates an example environment of a networking system having a structured data management system in accordance with one or more embodiments.

FIG. 11 is a schematic diagram illustrating environment 1100 within which one or more implementations of the structured data management system 100 can be implemented. For example, the structured data management system 100 may be part of a content management system 1102 (e.g., the content management system 906). Content management system 1102 may generate, store, manage, receive, and send digital content (such as digital content items). For example, content management system 1102 may send and receive digital content to and from client device of client devices 1106 by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices 1106 associated with one or more users. For example, a user may edit digital content using a client device of the client device 1106. The content management system 1102 can cause client device of the client devices 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the client device of the client devices 1106 only stores reduced-sized versions of the digital content. A user can navigate and browse the reduced-sized versions (e.g., a thumbnail of a digital image) of the digital content on client device of the client devices 1106. In particular, one way in which a user can experience digital content is to browse the reduced-sized versions of the digital content on client device of client devices 1106.

Another way in which a user can experience digital content is to select a reduced-size version of digital content to request the full- or high-resolution version of digital content from content management system 1102. In particular, upon a user selecting a reduced-sized version of digital content, client device of client devices 1406 sends a request to content management system 1102 requesting the digital content associated with the reduced-sized version of the digital content. Content management system 1102 can respond to the request by sending the digital content to client device of client devices 1106. Client device of client devices 1106, upon receiving the digital content, can then present the digital content to the user. In this way, a user can have access to large collections of digital content while minimizing the amount of resources used on client device of client devices 1106.

client device of client devices 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1106 may access content management system 1102.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed:

1. A computer-implemented method comprising:
generating, using a large language model associated with a context engine, a code segment comprising a set of parameters and a function executable by an interpreter associated with the context engine;
determining a serialized state for the interpreter based on execution of the code segment;
generating, from the serialized state of the interpreter, a persisted data element comprising a fixed data structure corresponding to at least one parameter from among the set of parameters;
generating an element graph comprising nodes representing a plurality of persisted data elements extracted from the serialized state of the interpreter, wherein the plurality of persisted data elements comprises the persisted data element; and
storing the element graph in an interpreter data store.

2. The computer-implemented method of claim 1, further comprising:
clustering the plurality of persisted data elements into a plurality of data models; and
updating the element graph based on an additional code segment comprising an additional set of parameters.

3. The computer-implemented method of claim 1, further comprising:
receiving a query from a client device associated with a user account;
generating, from the query, an additional code segment comprising an additional set of parameters executable by the interpreter;
determining an additional state for the interpreter based on the additional set of parameters defined by the additional code segment; and
determining, from the additional state of the interpreter, a new data model for an additional persisted data element.

4. The computer-implemented method of claim 1, further comprising:
processing with the large language model one or more source content items during an ingestion phase; and
generating, from the one or more source content items, one or more persisted data elements by converting a native structure of the one or more source content items to the fixed data structure.

5. The computer-implemented method of claim 1, further comprising:
accessing, via the large language model, the element graph comprising the plurality of persisted data elements stored within the interpreter data store;
providing, for display in a graphical user interface of a client device, the element graph comprising the plurality of persisted data elements comprising sets of parameters;
receiving one or more user inputs modifying a subset of persisted data elements from among the plurality of persisted data elements; and
updating the element graph based on modifying the subset of persisted data elements.

6. The computer-implemented method of claim 1, further comprising:
providing, for display in a graphical user interface of a client device associated with a user account, a save notification requesting permission to store a set of serialized states of the interpreter during a session of the large language model;
receiving, from the client device, one or more user interactions indicating permission to save the set of serialized states of the interpreter; and
storing the set of serialized states of the interpreter for the session of the large language model based on receiving the one or more user interactions.

7. The computer-implemented method of claim 1, further comprising:
encrypting the persisted data element based on a data model of the persisted data element.

8. A system comprising:
at least one processor; and
a non-transitory computer-readable medium storing instructions which, when executed by the at least one processor, cause the system to:
generate, using a large language model associated with a context engine, a plurality of code segments comprising a plurality of sets of parameters and a plurality of functions executable by an interpreter associated with the context engine;
determine a serialized state for the interpreter based on executing the plurality of code segments;
generate, from the serialized state of the interpreter, a plurality of persisted data elements comprising a fixed data structure corresponding to at least one parameter from among the plurality of sets of parameters;
generate an element graph comprising the plurality of persisted data elements for a user account, wherein the element graph comprises a plurality of nodes representing the plurality of persisted data elements and a plurality of edges representing relationships between the plurality of nodes; and
store the element graph in an interpreter data store.

9. The system of claim 8, further storing instructions which, when executed by the at least one processor, cause the system to:
generate an element graph comprising the plurality of persisted data elements for a user account, wherein the element graph comprises a plurality of nodes representing the plurality of persisted data elements and a plurality of edges representing relationships between the plurality of nodes;
cluster the plurality of persisted data elements into data models; and
update the element graph with an additional node based on an additional code segment comprising an additional set of parameters.

10. The system of claim 8, further storing instructions which, when executed by the at least one processor, cause the system to:
detect a collaborative session of the large language model, wherein a plurality of collaborating user accounts interact with the large language model;
determine a serialized merged state for the interpreter corresponding to the collaborative session of the large language model;

generate, from the serialized merged state of the interpreter, a collaborative persisted data element;
determine a shared data model for the collaborative persisted data element; and
store the collaborative persisted data element according to the shared data model.

11. The system of claim 8, further storing instructions which, when executed by the at least one processor, cause the system to:
receive a query from a client device associated with a user account;
generate, from the query utilizing the context engine, a prompt instructing the large language model to determine a data model necessitated by the query; and
determine the fixed data structure based on the data model.

12. The system of claim 8, further storing instructions which, when executed by the at least one processor, cause the system to:
determine a new data model indicated by a query for the large language model;
determine, based on one or more historic sessions of the large language model, that the new data model is not reflected in persisted data elements within the interpreter data store; and
extract, from the one or more historic sessions of the large language model, one or more persisted data elements corresponding to the new data model.

13. The system of claim 8, further storing instructions which, when executed by the at least one processor, cause the system to:
provide, for display via a large language model interface, a persisted data element from the plurality of persisted data elements;
receive one or more user inputs modifying the persisted data element; and
update the persisted data element based on modifying the persisted data element.

14. The system of claim 8, further storing instructions which, when executed by the at least one processor, cause the system to:
store a first subset of persisted data elements corresponding to a first data model for a first period of time; and
store a second subset of persisted data elements corresponding to a second data model for a second period of time that differs from the first period of time.

15. A non-transitory computer-readable medium storing executable instructions which, when executed by at least one processor, cause the at least one processor to:
generate, using a large language model associated with a context engine, a code segment comprising a set of parameters and a function executable by an interpreter associated with the context engine;
determine a serialized state for the interpreter based on executing the code segment;
generate, from the serialized state of the interpreter, a persisted data element comprising a fixed data structure corresponding to at least one parameter from among the set of parameters;
generate an element graph comprising a plurality of persisted data elements for a user account, wherein the element graph comprises a plurality of nodes representing the plurality of persisted data elements and a plurality of edges representing relationships between the plurality of nodes; and
store the element graph in an interpreter data store.

16. The non-transitory computer-readable medium of claim 15, further storing instructions which, when executed by the at least one processor, cause the at least one processor to:
generate, from the fixed data structure of the persisted data element, an additional fixed data structure for the persisted data element by modifying the fixed data structure of the persisted data element to align with a structure of an additional model; and
generate a response to a query using the additional model based on the additional fixed data structure of the persisted data element.

17. The non-transitory computer-readable medium of claim 15, further storing instructions which, when executed by the at least one processor, cause the at least one processor to:
receive a query from a client device associated with a user account;
generate an additional code segment comprising an additional set of parameters executable by the interpreter, wherein the additional code segment comprises a persisted data element from the interpreter data store; and
generate a response based on executing the additional code segment.

18. The non-transitory computer-readable medium of claim 15, further storing instructions which, when executed by the at least one processor, cause the at least one processor to:
receive one or more user interactions instructing the large language model to delete data associated with a specified data model; and
based on the one or more user interactions, delete the data associated with the specified data model.

19. The non-transitory computer-readable medium of claim 15, further storing instructions which, when executed by the at least one processor, cause the at least one processor to:
receive, during a collaborative session of the large language model, a query from a client device associated with a collaborating user account from a plurality of collaborating user accounts;
detect, for the collaborative session of the large language model, that a data model of the persisted data element requires permission from the collaborating user account;
determine that the persisted data element corresponds to the query; and
request permission from the client device associated with the collaborating user account to provide the persisted data element to the large language model.

20. The non-transitory computer-readable medium of claim 15, further storing instructions which, when executed by the at least one processor, cause the at least one processor to:
receive a query from a client device associated with a user account;
generate a vectorized segment of the query;
compare the vectorized segment of the query with a plurality of vectorized segments of a plurality of content items stored in a vector database; and
based on comparing the vectorized segment of the query with the plurality of vectorized segments, generate a prompt instructing the large language model to include the persisted data element in an additional code segment associated with the query.

* * * * *